(12) United States Patent
Yamakawa et al.

(10) Patent No.: US 6,244,317 B1
(45) Date of Patent: Jun. 12, 2001

(54) PNEUMATIC TIRE AND PROCESS FOR PRODUCTION THEREOF

(75) Inventors: Kazuto Yamakawa; Osamu Ozawa; Kazuo Suga; Hidekazu Takeyama, all of Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/447,560

(22) Filed: Nov. 23, 1999

Related U.S. Application Data

(62) Division of application No. 08/591,295, filed on Jan. 25, 1996, now Pat. No. 6,024,816.

(30) Foreign Application Priority Data

| Jan. 27, 1995 | (JP) | 7-11752 |
| Feb. 15, 1995 | (JP) | 7-26844 |
| Feb. 16, 1995 | (JP) | 7-28320 |
| Feb. 16, 1995 | (JP) | 7-28366 |
| Mar. 10, 1995 | (JP) | 7-51307 |

(51) Int. Cl.$^7$ ................................................. B60C 5/14
(52) U.S. Cl. .................. 152/510; 152/548; 152/DIG. 16; 156/123; 427/393.5
(58) Field of Search ............... 156/123, 110.1; 152/510, 548, DIG. 16, 511; 427/230, 236, 393.5

(56) References Cited

U.S. PATENT DOCUMENTS

| 2,405,986 | 8/1946 | Sullivan | 428/475.8 |
| 2,411,878 | 12/1946 | Hershberger | 428/475.5 |
| 4,657,285 | 4/1987 | Akiyama et al. | 285/256 |
| 4,985,510 | 1/1991 | Akiyama et al. | 428/475.5 |
| 4,994,222 | 2/1991 | Iizumi et al. | 264/135 |

FOREIGN PATENT DOCUMENTS

| 0 337 279 | 10/1989 | (EP) . | |
| 47-31761 | 8/1972 | (JP) . | |
| 64-16587 | 2/1979 | (JP) . | |
| 5-169907 | 7/1993 | (JP) | 152/510 |
| 5-169909 | 7/1993 | (JP) | 152/510 |
| 5-278409 | 10/1993 | (JP) . | |
| 5-318618 | 12/1993 | (JP) . | |
| 5-330307 | 12/1993 | (JP) . | |
| 7-40702 | 2/1995 | (JP) | 152/510 |
| 92/20538 | 11/1992 | (WO) . | |

*Primary Examiner*—Geoffrey L. Knable
(74) *Attorney, Agent, or Firm*—Finnegan, Henderson, Farabow, Garrett & Dunner, L.L.P.

(57) ABSTRACT

A pneumatic tire having an air permeation preventive layer comprising (A) a thin film of at least one aliphatic polyamide resin wherein at least part of the amide groups thereof are modified with alkoxyalkyl groups, (B) a thin film obtained from the curing a liquid composition containing (i) a multi component copolymer polyamide resin, (ii) a curable resin, and (iii) a curing agent for curing the curable resin, (C) a thin film obtained by coating and cross-linking a polymer composition containing (i) at least-one aliphatic polyamide resin wherein at least part of the amide groups thereof are modified with alkoxyalkyl groups and/or groups having curable unsaturated bonds and (ii) at least one cross-linking agent and/or curable resin other than an acid, or (D) a thin film of a vinylidene chloride-acrylonitrile copolymer obtained by copolymerizing 5 to 50 molar % of acrylonitrile.

12 Claims, 1 Drawing Sheet

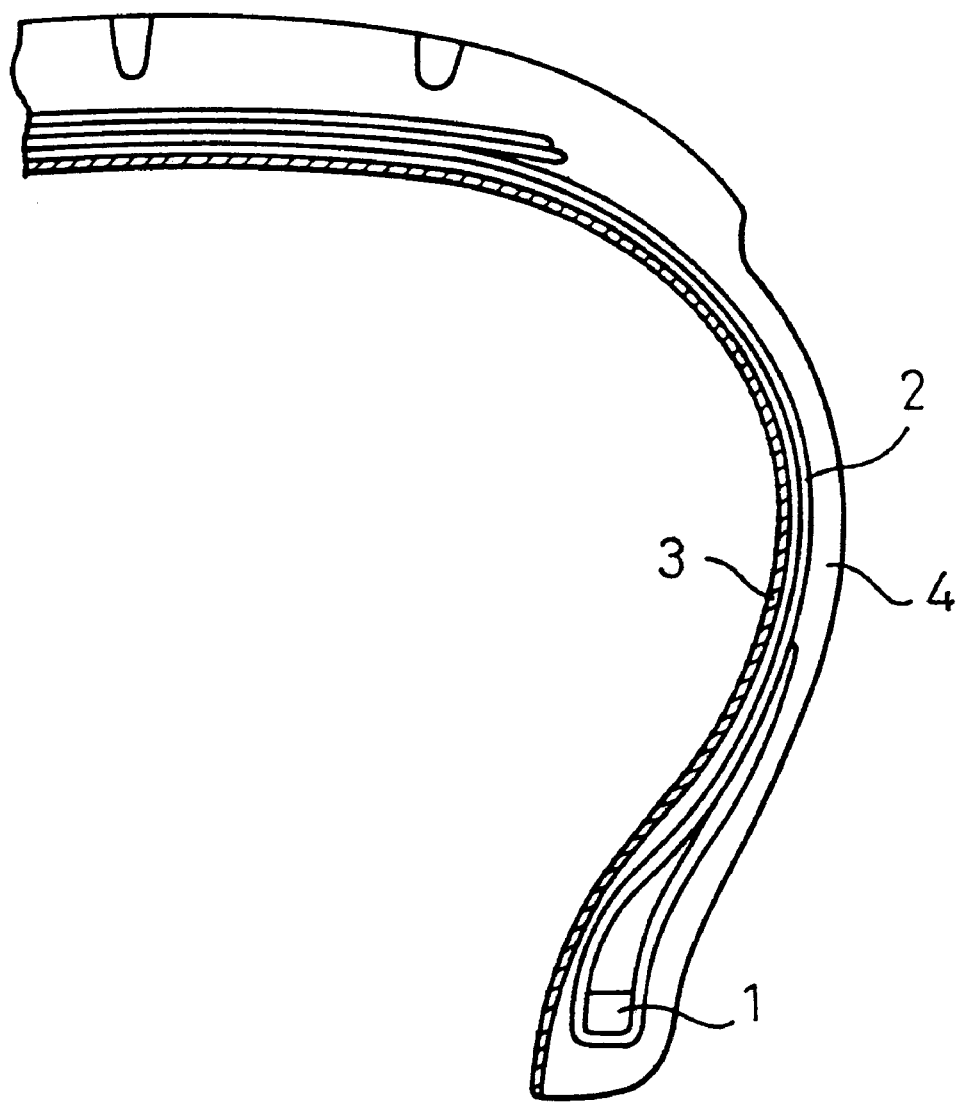

PNEUMATIC TIRE AND PROCESS FOR PRODUCTION THEREOF

This is a division of application Ser. No. 08/591,295, filed Jan. 25, 1996 now U.S. Pat. No. 6,024,816.

BACKGROUND OF THE INVENTION

1. Field of the Invention

The present invention relates to a pneumatic tire having a layer for preventing of air permeation which enables a reduction in the weight of the tire and is superior in bonding with a rubber layer, without detracting from the retention of air pressure in the tire and also relates to a process for the production of the same.

The present invention further relates to a pneumatic tire having a layer for preventing of air permeation which enables a reduction in the weight of the tire, is superior in bonding with the rubber layer, and, in superior in water resistance, heat resistance, and, in some cases, durability etc., without detracting from the retention of air pressure in the tire and also relates to a process for the production of the same.

2. Description of the Related Art

The reduction of fuel consumption is one of the major technical problems to be solved in the automobile industry. There have been increasingly stronger demands for reduction of the weight of the pneumatic tires as part thereof.

The inner surface of a pneumatic tire is provided with an inner liner layer composed of a low gas-permeable rubber such as halogenated butyl rubber so as to enable the tire air pressure to be kept constant. A halogenated butyl rubber, however, suffers from a large hysteresis loss. For this reason, when, after vulcanization of the tire, there are waves formed in the inner surface rubber of the carcass layer and the inner liner layer in the space between the carcass cords, the inner liner rubber layer deforms along with the deformation of the carcass layer. Thus there is the problem that the rolling resistance increases. Therefore, in general, the inner liner layer (e.g., halogenated butyl rubber) and inner surface rubber of the carcass layer are joined through a rubber sheet which is called a tie gum with a small hysteresis loss. Accordingly, in addition to the thickness of the inner liner layer of the halogenated butyl rubber, there is added the thickness of the tie gum and the layer as a whole becomes a thickness of over 1 mm (i.e., 1000 $\mu$m). As a result, this becomes one factor increasing the weight of the final tire product.

Various proposals have been made for using various materials, in place of the low gas-permeable rubber such as butyl rubber, as the inner liner layer or other air permeation preventive layer of the pneumatic tire. For example, Japanese Examined Patent Publication (Kokoku) No. 47-31761 discloses the coating of the inner surface of a vulcanized tire from 0.1 mm or less of a solution or dispersion of a synthetic resin such as polyvinylidene chloride, a saturated polyester resin, or a polyamide resin having an air permeation coefficient (cm$^3$ (standard state)/cm·sec·mmHg)) of not more than 1.0×10$^{-12}$ or less at 30° C. and of 5.0×10$^{-12}$ or less at 70° C.

The techniques disclosed in this publication provide the inner surface of the carcass of a vulcanized tire or the inner surface of the inner liner with a coating of a synthetic resin having a specific air permeation coefficient and making the thickness of the synthetic resin coating 0.1 mm or less, but the pneumatic tire disclosed in the publication had a problem in the bonding between the rubber and synthetic resin and further had a defect that, when a polyamide resin was used as the inner liner layer, the heat resistance and moisture resistance (or water resistance) were poor. Note that this publication did not disclose the use of an alkoxyalkylated polyamide, multiple copolymer polyamide resin, alkoxyalkylated polyamide, etc.

Several proposals have been made for using a vinylidene chloride resin for an air permeation preventive layer of a pneumatic tire. For example, Japanese Examined Patent Publication (Kokoku) No. 47-31761 proposes a tube-less tire which is coated with a synthetic resin such as a vinylidene chloride resin and discloses a vinylidene chloride-acryl ester copolymer. Further, Japanese Unexamined Patent Publication (Kokai) No. 5-278409 proposes to construct an inner liner layer by coating a thin film or solution of a vinylidene chloride-vinyl chloride copolymer on the inner surface of a tire, followed by vulcanizing. A vinylidene chloride-vinyl chloride copolymer, however, has a Tg of 40° C. or less and is inferior in long term heat resistance, and therefore, is not suitable for long term use at temperatures of, for example, about 80° C. A vinylidene chloride-vinyl chloride copolymer includes a large amount of chlorine, and therefore, easily degrades under heat. Further, most of them include up to 10% by weight of plasticizers for improving the workability or processability, but these plasticizers shift and the film hardens and the physical properties deteriorate. Thus there is the problem that they are not practical.

Japanese Unexamined Patent Publication (Kokai) No. 5-330307 discloses to halogenate the inner surface of the tire (using a conventionally known chlorination solution, bromine solution, or iodine solution) and form on top of that a polymer coating (thickness of 10 to 200 $\mu$m) of methoxymethyl nylon, a copolymer nylon, a blend of polyurethane and polyvinylidene chloride, or a blend of polyurethane and polyvinylidene fluoride. This publication, however, discloses the use of an acid catalyst composed of an organic acid such as citric acid or tartaric acid as a cross-linking catalyst for curing the methoxymethylated nylon, but such an acid catalyst causes the problem of an inferior flex fatique due to deterioration after curing and of early cracking during use and it is difficult to say that the bondability is sufficient either. Further, the art disclosed in the publication suffers from the problem of a poor moisture resistance (or water resistance) or heat resistance of the air permeation preventive layer when an uncross-linked or uncured polyamide resin is used, as the inner liner layer due to the non-crosslinking or curing thereof.

Further, Japanese Unexamined Patent Publication (Kokai) No. 5-318618 discloses a pneumatic tire having a thin film of methoxymethylated nylon as an inner liner. According to this proposal, the inner surface of a green tire is sprayed or coated with a solution or emulsion of methoxymethylated nylon, then the tire is vulcanized or alternatively the inner surface of a vulcanized tire is sprayed or coated with a solution or emulsion of methoxymethylated nylon so as to produce a pneumatic tire. However, since there is no treatment for bonding between the rubber of the inner surface of the tire and the methoxymethylated nylon, when the tire is used at a high load, there are still the problem that the methoxymethylated nylon film peels off from the rubber of the inner surface of the tire and the problem that the resistance to humidity (or water resistance) and heat resistance of the inner liner layer are poor due to the fact the methoxymethylated nylon is not cross-linked or cured.

SUMMARY OF THE INVENTION

Accordingly the object of the present invention is to provide a pneumatic tire using an air permeation preventive layer which enables the tire to be made lighter and which is bondable with a rubber layer, without detracting from the retention of air pressure by the tire and a process for production thereof.

Another object of the present invention is to provide a pneumatic tire having an air permeation preventive layer which enables the tire to be reduced in weight and is superior in the bonding with the rubber layer and in the water resistance and heat resistance, without detracting from the retention of air pressure by the tire.

In accordance with the present invention, there is provided a pneumatic tire having an air permeation preventive layer comprising (A) a thin film of at least aliphatic polyamide resin wherein at least part of the amide groups thereof are modified with alkoxyalkyl groups, (B) a thin film obtained from the curing of a liquid composition comprising (i) a multiple copolymer polyamide resin, (ii) a curable resin, and (iii) a curing agent for curing the curable resin, (C) a thin film obtained from the coating and cross-linking of a polymer composition containing (i) at least one type of aliphatic polyamide resin, wherein at least part of the amide groups thereof are modified by alkoxyalkyl groups and/or groups having curable unsaturated bonds and (ii) at least one cross-linking agent and/or curable resin other than an acid, or (D) a thin film of a vinylidene chloride-acrylonitrile copolymer obtained by copolymerizing 5 to 50 molar % of acrylonitrile.

BRIEF DESCRIPTION OF THE DRAWINGS

The present invention will now be better understood from the description set forth with reference to FIG. 1, which is a semi-cross-sectional view along the meridian direction showing the structure of an inner liner portion of a pneumatic tire of the present invention.

DESCRIPTION OF THE PREFERRED EMBODIMENTS

The present invention will now be explained in further detail.

The air permeation preventive layer of the pneumatic tire according to the present invention may be arranged at any location inside the tire, that is, at the inside or outside of the carcass layer or at the inside or outside of the rubber layer provided adjoining the carcass layer or any other location. The point is that there is no problem if it is arranged so as to prevent the permeation and dispersion of air from the inside of the tire and enable the air pressure inside the tire to be kept for a long period of time.

FIG. 1 is a semi-cross-sectional view along the meridian direction illustrating a typical example of the arrangement of an air permeation preventive layer of a pneumatic tire. In FIG. 1, a carcass layer 2 spans between the left and right bead cores 1. On the tire inner surface at the inside of the carcass layer 2 is provided with an inner liner layer 3. The inner liner layer 3 is composed from the cured or cross-linked first or second composition in the present invention. In FIG. 1, 4 shows a sidewall.

According to the first aspect of the present invention, there is provided a pneumatic tire comprising, as an air permeation preventive layer laminated through an adhesive, a thin film of at least one aliphatic polyamide resin wherein at least part of the amide groups are modified by alkoxyalkyl groups.

According to the first aspect of the present invention, there is further provided a process for producing a pneumatic tire comprising spraying or coating an adhesive to the surface of a carcass layer of a green tire composed of unvulcanized rubber or the surface of a rubber layer provided at the surface of the carcass layer, then spraying or coating the adhesive surface with a liquid composition containing at least one aliphatic polyamide resin wherein at least part of the amide groups are modified by alkoxyalkyl groups, and then vulcanizing the green tire.

According to the first aspect of the present invention, there is further provided a process for producing a pneumatic tire comprising spraying or coating an adhesive to the surface of a carcass layer of a vulcanized tire or the surface of a rubber layer provided at the surface of the carcass layer, then spraying or coating the adhesive surface with a liquid composition containing at least one aliphatic polyamide resin wherein at least part of the amide groups are modified by alkoxyalkyl groups.

According to the first aspect of the present invention, there is still further provided, as an air permeation preventive layer laminated through an adhesive, a pneumatic tire comprising a thin film of an aliphatic polyamide resin obtained from the cross-linking by heat treatment in the presence of an acid catalyst at least one aliphatic polyamide resin wherein at least part of the amide groups are modified with alkoxyalkyl groups.

According to the first aspect of the present invention, there is still further provided a process for producing a pneumatic tire comprising: spraying or coating an adhesive to the surface of a carcass layer of a green tire composed of unvulcanized rubber or the surface of a rubber layer provided at the surface of the carcass layer, then spraying or coating the adhesive surface with a solution composed of a liquid composition containing at least one aliphatic polyamide resin wherein at least part of the amide groups are modified by alkoxyalkyl groups and an acid catalyst, then vulcanizing the green tire.

According to the first aspect of the present invention, there is still further provided a process for producing a pneumatic tire comprising: spraying or coating an adhesive to the surface of a carcass layer of a vulcanized tire or the surface of a rubber layer provided at the surface of the carcass layer, then spraying or coating the adhesive surface with a solution comprising a liquid composition containing at least one aliphatic polyamide resin wherein at least part of the amide groups are modified with alkoxyalkyl groups and an acid catalyst.

According to the first aspect of the present invention, there is still further provided a pneumatic tire having an air permeation preventive layer obtained by coating a polymer composition containing (i) at least one aliphatic polyamide resin wherein at least part of the amide groups are modified with alkoxyalkyl groups and/or groups having curable unsaturated bonds and (ii) at least one cross-linking agent and/or curable resin on the surface of the carcass layer of a pneumatic tire or the surface of a rubber layer provided on the surface of the carcass layer, followed by cross-linking.

According to the first aspect of the present invention, there is still further provided a process for producing a pneumatic tire having an air permeation preventive layer comprising: spraying or coating an adhesive to the surface of a carcass layer of a green tire composed of unvulcanized rubber or the surface of a rubber layer provided at the surface of the carcass layer, then spraying or coating the adhesive surface with a polymer composition containing (i) at least one aliphatic polyamide resin wherein at least part of the amide groups thereof are modified with alkoxyalkyl groups and/or groups having curable unsaturated bonds and (ii) at least one cross-linking agent and/or curable resin, then vulcanizing the green tire.

According to the first aspect of the present invention, as the aliphatic polyamide resin, a modified aliphatic polyamide resin wherein at least one amide group thereof is modified with (i) an alkoxyalkyl group and/or (ii) a group having a curable unsaturated bond is used.

The modified aliphatic polyamide resin used in the first aspect of the present invention, as mentioned above, is one wherein at least part of the amide groups thereof are modified with an alkoxyalkyl group —$R^1$—O—$R^2$ (wherein, $R^1$ is a $C_1$ to $C_4$ alkylene group, for example, a methylene, ethylene, propylene, or butylene group, $R^2$ is a $C_1$ to $C_4$ alkyl group, for example, methyl, ethyl, propyl, or butyl group) and/or a group having a curable unsaturated bond as mentioned below.

Examples of the group having a curable unsaturated bond an N-methylol-acrylamide group, acryloyl group, methacrylol group, vinyl group, allyl group, etc. these groups may be introduced by, for example, a reaction between an unsaturated acid chloride and >NH group of the amide group or a reaction with an N-methylol compound having an unsaturated bond.

The alkoxyalkyl group may be introduced by the method of reacting methanol and para-formaldehyde with the >NH group of a polyamide in the presence of an alkali catalyst.

Further, the alkoxyalkyl group and unsaturated bond may be simultaneously given. For example, they may be obtained by the method of reacting an unsaturated acid chloride to the >NH group of a polyamide to form a relatively stable >N—CO-bond, then alkoxyalkylating the remaining >NH groups or the method of effecting a dehydrogenation or dealcoholization reaction, that is, a condensation reaction, between the >NH group of the polyamide and an N-methylolate or N-alkoxyalkylate having an unsaturated bond having a good reactivity with polyamides to introduce an unsaturated bond in the side chain of the polyamide and further alkoxyalkylating the remaining >NH groups.

As the polyamide, for example, linear polyamides, which are called ordinary nylons such as nylon 6, nylon 66, nylon 11, nylon 610, nylon 612, nylon 10, and nylon 6/66 and polymers having —$NH_2$ groups in the side chains thereof are extremely useful. Examples of the unsaturated acid chlorides are acrylic acid chloride, methacrylic acid chloride, crotonic acid chloride, and cinnamoyl chloride. Further, as the N-methylolate having the unsaturated bond are N-methylolacrylamide, N-methylolmethacryl-amide, etc. Further, examples of the N-alkoxyalkylate having an unsaturated bond are N-methoxymethylacrylamide, N-butoxymethylacrylamide, etc.

Further, when alkoxyalkylating the remaining >NH groups or —$NH_2$ groups, the remaining groups are made to react with aldehydes, for example, formaldehyde, acetoaldehyde, etc. and alcohols, for example, methanol and ethanol.

The cross-linkable elastic polyamide usable in the present invention and produced by these methods is used in an amount not detracting from the pliability suitable for a cross-linked article, that is, is made preferably 50% or less, further, more preferably 3 to 20%. Further, the flexibility given by the N-alkoxyalkylization must be stopped at the extent at which the physical properties are practical. It is preferable to use one with an N-substitution rate of 30 to 50%.

The group having the unsaturated bond, for example, as disclosed in Japanese Unexamined Patent Publication (Kokai) No. 51-24677, page 2, left bottom column to right top column, is introduced into the polyamide resin by immersing a polyamide resin such as nylon 6 into an aqueous solution of N-methylol-acrylamide, ammonium chloride, and hydroquinone (or copper chloride), followed by drying and heat treating, washing with water and drying, then dissolving the reaction product in formic acid containing phenol therein, and adding thereto a formalin solution containing therein methanol, KOH, paraformaldehyde, or oxalic acid.

The modified aliphatic polyamide resin usable in the first aspect of the present invention is dissolved in a solvent when it is to be coated. The solvent is not particularly limited so long as it is a solvent which dissolves the modified aliphatic polyamide resin. Examples of such a solvent are aliphatic alcohols such as methanol and ethanol and aromatic alcohols such as phenol and cresol etc. Further, to these alcohol solvents, water, ethyl acetate, toluene, methyl ethyl ketone, benzene, chloroform, etc. can be added. The concentration of the total amount of the modified aliphatic polyamide resin and cross-linking agent, curable resin, and curing agent for the curable resin is not particularly limited, but is preferably 5 to 30% by weight.

Examples of the acid catalyst which may be used for cross-linking the modified aliphatic polyamide resin in the first aspect of the present invention are one or more acids selected from the group consisting of citric acid, tartaric acid, glutamic acid, lactic acid, itaconic acid, azelaic acid, succinic acid, glycolic acid, crotonic acid, hypophosphorous acid, lauric acid, chloroacetic acid, boric acid, maleic acid, oxalic acid, adipic acid, and malonic acid. An aromatic sulfonic acid may also be suitably used. Examples of such an aromatic sulfonic acid are one or more acids selected from the group consisting of p-toluenesulfonic acid, o-toluene-sulfonic acid, m-toluenesulfonic acid, benzene-sulfonic acid, p-cresolsulfonic acid, o-cresolsulfonic acid, m-cresolsulfonic acid, naphthalenesulfonic acid, and dode-cylbenzenesulfonic acid. The amount of the acid catalyst used may be as in the past, preferably is 3 to 5 parts by weight, based on 100 parts by weight of the modified aliphatic polyamide.

Examples of the cross-linking agents other than acid catalysts which may be used for cross-linking the modified aliphatic polyamide resin in the first aspect of the present invention are sulfur alone, sulfur-releasing compounds (e.g., tetramethylthiuram disulfide, morpholine disulfide, tetraethylthiuram disulfide, tetrabutylthiuram disulfide, dipentamethylenethiuram pentamethylene, dimethyldiphenylthiuram disulfide), rubber vulcanization accelerators (e.g., thiazoles such as 2-mercaptobenzothiazole, dibenzothiazyl-disulfide, 2-mercaptobenzothiazole zinc salts, and dithio acid salts such as dichlorohexyl-benzothiazyl-sulfenamide, thiurams such as tetramethylthiuram disulfide, tetramethylthiuram monosulfide, tetraethylthiuram disulfide, and dipentamethylenethiuram tetrasulfide, and zinc dimethyldithiocarbaminate, guanidines such as diphenylguanidine, thioureas such as 1,3-diphenylthiourea), etc. Note that the thiurams may also be used jointly as vulcanization accelerators. The amount of these cross-linking agents used is not particularly limited as in the past, but preferably, depending on the type of the cross-linking agent used, is 0.1 to 10 parts by weight, more preferably 0.1 to 5 parts by weight, based on 100 parts by weight of the polymer. Note that in addition to the above-mentioned crosslinking agents, it is also possible to use peroxides such as dicumylperoxide (DCP).

For the cross-linking agent, to smooth the cross-linking reaction, it is possible to use jointly an organic halogen donor (e.g., chlorosulfonated polyethylene or chloroprene) or an inorganic halogenated substance (e.g., stannous chloride, calcium chloride, iron chloride, aluminum chloride, zinc chloride, calcium fluoride, zinc bromide), etc. in an amount of 0.1 to 5 parts by weight, based on 100 parts by weight of the polymer.

Examples of the curable resin which may be used for curing the modified aliphatic polyamide resin in the first aspect of the present invention are epoxide compounds, which may be freely selected from glycidyl ethers, epoxyurethane resins, glycidyl ether-esters, glycidyl amine linear aliphatic epoxy resins, aliphatic epoxy resins, etc. As the curing agent for the curable resin, it is possible to use various types of curing agents such as aromatic amines, acid anhydrides, polyamides, aliphatic amines, latent curing agents, etc., but generally meta-phenylenediamine, diaminodiphenylmethane, anhydrous maleic acid, pyromellitic acid anhydrides, hexahydro anhydrous phthalic acid, and other phthalic acid anhydrides, hexamethylene diamine, etc. and also sebacic acid dehydrazide, dicyandiamide, piperadine sebacic acid salts, etc. may be used. The curable resin, while differing depending on the combination with the curing agent, is preferable present in an amount of 60 parts by weight or less, based on 100 parts by weight of the cross-linkable elastic polyamide.

To cross-link the modified aliphatic polyamide resin in the first aspect of the present invention, it is possible to further use an alkylphenol formalin resin or alkylresorcinol formalin resin such as described, for example, in Japanese Unexamined Patent Publication (Kokai) No. 51-18756, page 3, top left column to page 4, top right column.

The first production process of the pneumatic tire according to the first aspect of the present invention will be explained with reference to the case where the inner liner layer 3 is arranged at the inside of the carcass layer 2, as shown in FIG. 1, the inner surface of the carcass layer of a green tire comprising unvulcanized rubber is coated with an adhesive, then the top thereof is sprayed or coated with at least one aliphatic polyamide resin wherein at least part of the amide groups are modified with alkoxyalkyl groups, then the green tire is vulcanized by an ordinary method, whereby the desired light weight pneumatic tire is produced. Note that the same procedure may be followed when providing the inner liner layer at the outer circumference of the carcass layer.

On the other hand, when the air permeation preventive layer is arranged at the surface (that is, the inner circumference) of the carcass layer of a vulcanized tire in accordance with the present invention, the surface of the vulcanized carcass layer which has been vulcanized by an ordinary method is coated with an adhesive, then the top thereof is sprayed or coated with at least one aliphatic polyamide resin wherein at least part of the amide groups have been modified with alkoxyalkyl groups and the assembly is heated, whereby the desired light weight pneumatic tire is produced.

In the production of the pneumatic tire according to the first aspect of the present invention, it is possible to halogenate the surface of the carcass layer or the rubber layer on top of the same by an ordinary method. This halogenation treatment may be performed, for example, using a chlorine solution, bromine solution, iodine solution, etc. for halogenation of general rubber. As such a solution, it is possible to use an aqueous solution including chlorine, bromine, or iodine or a dilute aqueous solution of 12N hydrochloric acid. Further, it is preferable to use a dilute solution of a compound containing —N(X)C(O)— groups (wherein X is a halogen) in an organic solvent. Specific examples of such compounds are trichloro, dichloro, or monochloro isocyanuric acid. Use of a solution of 2 to 20% by weight of trichloroisocyanuric acid in an organic solvent (for example a solution of a ketone organic solvent such as methyl ethyl ketone or a solution of an ester organic solvent such as ethyl acetate) is most preferred.

Examples of the adhesive to be coated on the surface of the carcass layer in the production process of a pneumatic tire according to the first aspect of the present invention are those which undergo a bonding reaction and self-curing reaction with the rubber of the carcass layer and the resin of the air permeation preventive layer during the vulcanization by the heat of vulcanization, such as a phenol resin adhesive, a chlorinated rubber adhesive, or an isocyanate adhesive.

Preferable examples of these adhesives are phenol resin types (e.g., Chemlock 234B made by LORD Co.), chlorinated rubber types (e.g., Chemlock 205 made by LORD Co.), isocyanate type (e.g., Chemlock 402 made by LORD Co.), etc.

The material of the rubber layer for bonding with the air permeation preventive layer according to the first aspect of the present invention is not particularly limited. Any rubber material which has been generally used as a rubber material for a tire in the past may be used. Examples of such a rubber are rubber compositions composed of diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The inner liner layer according to the first aspect of the present invention has a melting point of 80° C. or more, preferably 100° C. or more and an air permeation coefficient of $25 \times 10^{-12}$ cc·cm/cm$^2$·sec·cmHg (at 30° C.) or less, preferably $5 \times 10^{-12}$ cc·cm/cm$^2$·sec·cmHg (at 30° C.) or less. When the air permeation coefficient is $25 \times 10^{-12}$ cc·cm/cm$^2$·sec·cmHg (at 30° C.) or less, the thickness of the inner liner layer can be made to ½ or less of the thickness of the conventional inner liner layers.

On the other hand, the Young's modulus is 1 to 500 MPa, preferably 10 to 300 MPa, and the thickness is 0.01 to 1.0 mm, preferably 0.02 to 0.5 mm. When the Young's modulus is less than 1 MPa, wrinkles will form at the time of forming the tire, whereby handling will become difficult, while when more than 500 MPa, it is not possible for the film to follow the deformation of the tire during use.

According to the second aspect of the present invention, there is provided a pneumatic tire containing an air permeation preventive layer comprising a thin film obtained from the curing of a liquid composition containing (i) a multi component copolymer polyamide resin, (ii) a curable resin, and (iii) a curing agent for curing the curable resin.

According to the second aspect of the present invention, there is further provided a process for producing a pneumatic tire comprising: spraying or coating the liquid composition on a surface of a carcass layer of a green tire composed of unvulcanized rubber or the surface of a rubber layer provided on the surface of the carcass layer which has been halogenated or the surface to which an adhesive has been coated, in place of the halogenation treatment (or in addition to the halogenation treatment), then vulcanizing the green tire, whereby an air permeation preventive layer is formed.

According to the second aspect of the present invention, there is further provided a process for producing a pneumatic tire comprising: spraying or coating the liquid composition on a surface of a carcass layer of a vulcanized tire or the surface of a rubber layer provided on the surface of the carcass layer, which has been halogenated or the surface to which an adhesive has been coated, in place of the halogenation treatment (or in addition to the halogenation treatment), then curing or cross-linking the liquid composition to form the air permeation preventive layer.

The liquid composition comprising the air permeation preventive layer in the second aspect of the present invention, as mentioned above, includes as essential components (i) a multiple copolymer polyamide resin, (ii) a curable resin, and (iii) a curing agent for causing the curable resin to cure. Here, the multi component copolymer polyamide resin means a three component or four component or greater copolymer polyamide of a specific copolymerization ratio such as a copolyamido nylon such as nylon 6/nylon 66 (for example, a copolymerization ratio of 70/30 to 50/50) and further nylon 6/nylon 66/nylon 610, nylon 6/nylon 66/nylon 12, nylon 6/nylon 66/nylon 610/nylon 12, etc. These multi component copolymer polyamide resins may be used alone or in any combination thereof. These multi component copolymer polyamide resins are commercially available, for example, as CM4000, CM4001, CM8000, etc. made by Toray. These multi component copolymer polyamides are soluble in solvents such as lower aliphatic alcohols such as methanol, ethanol, and propanol or mixed solvents comprised of these alcohols plus water, trichloroethylene, chloroform, carbon tetrachloride, benzyl alcohol, phenol, formic acid, acetic acid, etc. in small amounts.

The curable resin usable in the second aspect of the present invention may be a resin, which is nonreactive with a multi component copolymer polyamide resin, but itself reacts to act to fix the polyamide resin in the cured network (generally called an IPN structure). Examples of such a curable resin are a hard epoxy resin such as a bisphenol A type epoxy resin (ELA-128 made by Sumitomo Chemical), biphenol F type epoxy resin, phenol novolak type epoxy resin, or cresol novolak type epoxy resin, a soft epoxy resin such as a urethane modified epoxy resin and flexible epoxy resin, etc.

These curable resins can, in the state mixed with a multi component copolymer polyamide, improve the water resistance and heat resistance of the air permeation preventive layer by causing them to cure in accordance with ordinary methods after mixing in a later explained curing agent to thereby cause IPN (inter penetrating polymer network) of the multi component copolymer polyamide so as to affix the same.

Examples of the curing agent usable for curing the curable resin in the second aspect of the present invention are a polyamine, polyamide amine (Sanwa Chemical's Sunmide (preferably of an amine value of at least 150) A-100, A1001, curing at 180° C.×10 minutes), acid anhydride, thiol compound, phenol compound (resol type), imidazole compound, dicyandiamide, acid hydrazide, Louis acid, etc. In addition, a urea resin or melamine resin may be used.

The air permeation preventive layer according to the second aspect of the present invention is constructed by mixing in advance the multi component copolymer polyamide resin and curable resin in a suitable solvent such as a lower aliphatic alcohol such as methanol, ethanol, or propanol or a mixed solvent composed of these and a small amount of water, trichloroethylene, chloroform, carbon tetrachloride, benzyl alcohol, phenol, formic acid, or acetic acid, adding a curing agent to cure it, then coating this (coating what is in a particle state in the solution, then heating so that the particles melt and form a continuous layer) or else first mixing the multi component copolymer polyamide resin and a curable resin in a solvent, adding a curing agent thereto, then coating before the processing. Further, in the case of a so-called latent curing agent (not curing even when mixed in advance), it is possible to mix all of the components at one time and effect the curing at the time of vulcanization of the tire. Even a curing agent which is insoluble in alcohol etc. may be used in the form of a suspended state in the system. The concentration of the total of the multi component copolymer polyamide resin, curable resin, and curing agent for the curable resin in the solution is not particular limited so long as it does not adversely affect the coating etc., but preferably is about 5 to 30% by weight.

Regarding the first production process of the pneumatic tire according to the second aspect of the present invention, the case where the inner liner layer 3 is arranged at the inside of the carcass layer 2 is explained as shown in FIG. 1. Thus, the inner surface of the carcass layer of a green tire comprising unvulcanized rubber is halogenated or coated with an adhesive, the top thereof is sprayed or coated with a composition containing (i) the multi component copolymer polyamide resin, (ii) a curable resin compatible with the multi component copolymer polyamide resin, and (iii) a curing agent for curing the curable resin, then the green tire is vulcanized by an ordinary method, whereby the desired light weight pneumatic tire is produced. Note that the same procedure may be followed when providing the inner liner layer at the outer circumference of the carcass layer.

On the other hand, when the air permeation preventive layer is arranged at the surface (that is, the inner circumference) of the carcass layer of a vulcanized tire in accordance with the present invention, the surface of the vulcanized carcass layer, which has been vulcanized by an ordinary method, is halogenated or coated with an adhesive, instead of the halogenation treatment (or in addition to the halogenation treatment), then the top thereof is sprayed or coated with the liquid composition according to the present invention and heating is applied, if necessary, to effect curing, whereby the desired light weight pneumatic tire having the air permeation preventive layer is produced.

In the production process of the pneumatic tire according to the second aspect of the present invention, it is possible to halogenate the surface of the carcass layer by a generally performed method. For example, it is possible to use a chlorine solution, bromine solution, iodine solution, etc. for halogenation of general rubber. As such a solution, it is possible to make use of an aqueous solution including chlorine, bromine, or iodine or a dilute aqueous solution of 12N hydrochloric acid. Further, it is preferable to use a dilute solution of a compound containing —N(X)C(O)— groups (wherein X is a halogen) in an organic solvent. Examples of specific examples of such compounds are trichloro, dichloro, or monochloro isocyanuric acid. Use of a solution of 2 to 20% by weight of trichloroisocyanuric acid in an organic solvent (e.g., a solution of a ketone organic solvent such as methyl ethyl ketone or a solution of an ester organic solvent such as ethyl acetate) is most preferred.

Examples of the adhesive to be coated on the surface of the carcass layer in the production process of a pneumatic tire according to the second aspect of the present invention are those which undergoes a bonding reaction and self-curing reaction with the rubber of the carcass layer and the resin of the air permeation preventive layer during the vulcanization by the heat of vulcanization such as a phenol resin adhesive, a chlorinated rubber adhesive, or an isocyanate adhesive.

The preferable examples of these adhesives are phenol resin types (e.g., Chemlock 234B made by LORD Co.), chlorinated rubber types (e.g., Chemlock 205 made by LORD Co.), isocyanate type (e.g., Chemlock 402 made by LORD Co.), etc.

The material of the rubber layer for bonding with the air permeation preventive layer according to the second aspect of the present invention is not particularly limited. Any rubber material which has been generally used as a rubber material for a tire in the past may be used. Examples of such a rubber are rubber compositions comprising diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The inner liner layer according to the second aspect of the present invention has a melting point of 90° C. or more, preferably 100° C. or more, and an air permeation coefficient of $25\times10^{-12}$ cc·cm/cm$^2$·sec·cmHg (at 30° C.) or less, preferably $5\times10^{-12}$ cc·cm/cm$^2$·sec·cmHg (at 30° C.) or less. When the air permeation coefficient is more than $25\times10^{-12}$ cc·cm/cm$^2$·sec·cmHg (at 30° C.) the thickness of the inner liner layer can be made the thickness of the conventional inner liner layers to ½ or less.

On the other hand, the Young's modulus is 1 to 500 MPa, preferably 10 to 300 MPa, and the thickness is 0.01 to 1.0 mm, preferably 0.02 to 0.5 mm. When the Young's modulus is less than 1 MPa, then wrinkles will form at the time of forming the tire, whereby handling will become difficult, while when more than 500 MPa, it is not possible for the film to follow the deformation of the tire during use.

According to the third aspect of the present invention, there is provided a pneumatic tire having an air permeation preventive layer obtained by coating a polymer composition containing (i) at least one aliphatic polyamide resin wherein at least part of the amide groups thereof are modified by alkoxyalkyl groups and/or groups having curable unsaturated bonds and (ii) at least one cross-linking agent other than an acid and/or curable resin on the surface of a carcass layer of a pneumatic tire or the surface of a rubber layer provided on the surface of the carcass layer which has been halogenated, followed by cross-linking and/or curing.

The cross-linked air permeation preventive layer of the polymer composition according to the third aspect of the present invention preferably has a melting point of 80° C. or more, an air permeation coefficient of $25\times10^{-12}$ cc·cm/cm$^2$·sec·cmHg (at 30° C.) or less and a Young's modulus of 1 to 500 MPa.

In accordance with the third aspect of the present invention, there is further provided a process for producing a pneumatic tire having an air permeation preventive layer comprising a thin film obtained by halogenating the surface of a carcass layer of a green tire comprising unvulcanized rubber or the surface of a rubber layer provided on the surface of the carcass layer, then spraying or coating on the halogenated surface a polymer composition containing (i) at least one aliphatic polyamide resin wherein at least part of the amide groups thereof are modified with alkoxyalkyl groups and/or groups having curable unsaturated bonds and (ii) at least one cross-linking agent other than an acid and/or curable resin, and then vulcanizing the green tire.

In accordance with the third aspect of the present invention, there is further provided a process for producing a pneumatic tire having an air permeation preventive layer comprising a thin film obtained by halogenating the surface of a carcass layer of a vulcanized tire or the surface of a rubber layer provided on the surface of the carcass layer, then spraying or coating on the halogenated surface a polymer composition containing (i) at least one aliphatic polyamide resin wherein at least part of the amide groups thereof are modified by alkoxyalkyl groups and/or groups having curable unsaturated bonds and (ii) at least one cross-linking agent other than an acid and/or curable resin, followed by cross-linking and/or curing.

The polymer composition comprising the air permeation preventive layer in the third aspect of the preset invention, as mentioned above, includes as essential components (i) at least one aliphatic polyamide resin wherein at least part of the amide groups thereof are modified by alkoxyalkyl groups and/or groups having curable unsaturated bonds and (ii) at least one cross-linking agent other than an acid and/or curable resin. Here, examples of the aliphatic polyamide resin are nylon 6, nylon 66, nylon 610, nylon 6/nylon 66, nylon 612, nylon 8, nylon 10, nylon 11, nylon 12, etc. as well as any mixtures thereof and copolymers of two or more of these components.

According to the third aspect of the present invention, as the aliphatic polyamide resin, as mentioned above, a modified aliphatic polyamide resin wherein at least part of the amide groups thereof are modified by alkoxyalkyl groups and/or groups having curable unsaturated bonds or a mixture of at least one aliphatic polyamide resin wherein at least part of the amide groups thereof are modified with alkoxyalkyl groups and at least one aliphatic polyamide resin wherein at least part of the amide groups thereof are modified with groups having curable unsaturated bonds is used.

The modified aliphatic polyamide resin usable in the third aspect of the present invention, as mentioned above, is those wherein at least part of the amide groups thereof are modified with an alkoxyalkyl group —$R^1$—O—$R^2$ (wherein, $R^1$ is a $C_1$ to $C_4$ alkylene group, for example, a methylene, ethylene, propylene, or butylene group, $R^2$ is a $C_1$ to $C_4$ alkyl group, for example, methyl, ethyl, propyl, or butyl group) and/or a group having a curable unsaturated bond as mentioned below.

Examples of the group having a curable unsaturated bond are an N-methylol-acrylamide group, acryloyl group, methacrylol group, vinyl group, allyl group, etc. For example, it may be introduced by a reaction between an unsaturated acid chloride and >NH group of the amide group or a reaction with an N-methylol compound having an unsaturated bond.

The alkoxyalkyl group may be introduced by the method of reacting methanol and paraformaldehyde with the >NH group of a polyamide in the presence of an alkali catalyst.

Further, the alkoxyalkyl group and unsaturated bond may be simultaneously given. For example, they may be obtained by the method of reacting the >NH group of a polyamide and an unsaturated acid chloride to form a relatively stable >N—CO-bond, then alkoxyalkylating the remaining >NH group or the method of effecting a dehydrogenation or dealcoholization reaction, that is, a condensation reaction, between the >NH group of the polyamide and an N-methylolate or N-alkoxyalkylate having an unsaturated bond having a good reactivity with polyamides to introduce an unsaturated bond in the side chain of the polyamide and further alkoxyalkylating the remaining >NH groups.

As the polyamide, for example, linear polyamides, which are called ordinary nylons such as nylon 6, nylon 66, nylon 11, nylon 610, nylon 612, nylon 10, nylon 12, and nylon 6/66 and polymers having —NH$_2$ groups in their side chains are extremely useful. Examples of the unsaturated acid chlorides are acrylic acid chloride, methacrylic acid chloride, crotonic acid chloride, and cinnamoyl chloride. Further, as the N-methylolate having the unsaturated bond, there are for example N-methylolacrylamide, N-methylolmethacrylamide, etc. Further, as-the N-alkoxyalkylate having an unsaturated bond, there are for example N-methoxymethylacrylamide, N-butoxymethylacrylamide, etc.

Further, when alkoxyalkylating the remaining >NH groups or —NH$_2$ groups, the remaining groups are reacted with aldehydes, for example, formaldehyde, acetoaldehyde, etc. and alcohols, for example, methanol and ethanol.

The cross-linkable elastic polyamide usable in the present invention and produced by these methods is preferably used in an amount not detracting from the pliability suitable for a cross-linked article, that is, is made 50% or less, further, 3 to 20%. Further, the flexibility given by the N-alkoxyalkylization must be stopped at the extent at which the physical properties are practical. It is preferable to use one with an N-substitution rate of 30 to 50%.

The group having the unsaturated bond, for example, as disclosed in Japanese Unexamined Patent Publication (Kokai) No. 51-24677, page 2, left bottom column to right top column, is introduced into the polyamide resin by immersing a polyamide resin such as nylon 6 into an aqueous solution of N-methylol-acrylamide, ammonium chloride, and hydroquinone (or copper chloride), followed by drying and heat treating, and further by washing with water and drying. Thereafter the reaction product is dissolved in formic acid containing phenol, followed by adding to a formalin solution containing methanol, KOH, para-formaldehyde, and oxalic acid.

The modified aliphatic polyamide resin usable in the third aspect of the present invention is dissolved in a solvent when to be coated. The solvent is not particularly limited so long as it is a solvent which dissolves the modified aliphatic polyamide resin. Examples are aliphatic alcohols such as methanol and ethanol and aromatic alcohols such as phenol and cresol etc. Further, it is also possible to add to these alcohol solvents water, ethyl acetate, toluene, methyl ethyl ketone, benzene, chloroform, etc. The concentration of the total amount of the modified aliphatic polyamide resin and cross-linking agent, curable resin, and curing agent for the curable resin is not particularly limited, but is preferably 5 to 30% by weight.

Examples of cross-linking agents other than acid catalysts which may be used for cross-linking the modified aliphatic polyamide resin in the third aspect of the present invention are sulfur alone, sulfur-releasing compounds (for example, tetramethylthiuram disulfide, monopholin disulfide, tetra-ethylthiuram disulfide, tetrabutylthiuram disulfide, dipentamethylenethiuram pentamethylene, dimethyldiphenylthiuram disulfide), rubber vulcanization accelerators (e.g., thiazoles such as 2-mercaptobenzothiazole, dibenzothiazyl-disulfide, 2-mercaptobenzothiazole zinc salts, and dithio acid salts such as dichlorohexyl-benzothiazyl-sulfenamide, thiurams such as tetramethylthiuram-disulfide, tetramethylthiuram monosulfide, tetraethylthiuram disulfide, and dipentamethylenethiuram tetrasulfide, and zinc dimethyldithiocarbaminate, guanidines such as diphenylguanidine, thioureas such as 1,3-diphenylthiourea), etc. Note that the thiurams may also be used together as vulcanization accelerators. The amount of these cross-linking agents used is not particularly limited as in the past, but preferably, depending on the type of the cross-linking agent used, is 0.1 to 10 parts by weight, based on 100 parts by weight of the polymer, more preferably 0.1 to 5 parts by weight. Note that, in addition thereto, it is also possible to use peroxides such as dicumylperoxide (DCP).

For the cross-linking agent, to smooth the cross-linking reaction, it is possible to use together an organic halogen donor (e.g., chlorosulfonated polyethylene or chloroprene) or an inorganic halogenated substance (e.g., stannous chloride, calcium chloride, iron chloride, aluminum chloride, zinc chloride, calcium fluoride, zinc bromide), etc. in an amount of 0.1 to 5 parts by weight, based on 100 parts by weight of the polymer.

Examples of the curable resin which may be used for curing the modified aliphatic polyamide resin in the third aspect of the present invention are a compound having an epoxy group. This may be selected from glycidyl ethers, epoxyurethane resins, glycidyl ether-esters, glycidylamine linear aliphatic epoxy resins, aliphatic epoxy resins, etc. As the curing agent for the curable resin, it is possible to use various types of curing agents such as aromatic amines, acid anhydrides, polyamides, aliphatic amines, latent curing agents, etc., but general curing agents are metaphenylenediamine, diaminodiphenylmethane, anhydrous maleic acid, pyromellitic acid anhydrides, hexahydro anhydrous phthalic acid, and other phthalic acid anhydrides, hexamethylene diamine, sebacic acid dehydrazide, dicyanediamide, piperadine sebacic acid salts, etc. The amount of the curable resin used is not particularly limited, but generally is preferable present in an amount of 60 parts by weight or less, based on 100 parts by weight of the polyamide resin.

To cross-link the modified aliphatic polyamide resin in the third aspect of the present invention, it is possible to further use an alkylphenol formalin resin or alkylresorcinol formalin resin such as disclosed in, for example, Japanese Unexamined Patent Publication (Kokai) No. 51-18756, page 3, top left column to page 4, top right column.

The first production process of the pneumatic tire according to the third aspect of the present invention will be, explained with reference to the case where the air permeation preventive layer (inner liner layer) 3 is arranged at the inside of the carcass layer 2 as shown in FIG. 1. The inner surface of the carcass layer of a green tire comprising unvulcanized rubber is halogenated in accordance with an ordinary method, then the top thereof is sprayed or coated with the modified polyamide resin composition, then the green tire is vulcanized by an ordinary method, whereby the desired light weight pneumatic tire is produced. Note that the same procedure may be followed when providing the air permeation preventive layer at the outer circumference of the carcass layer.

On the other hand, when the air permeation preventive layer is arranged at the surface (that is, the inner circumference) of the carcass layer of a vulcanized tire in accordance with the present invention, the surface of the vulcanized carcass layer which has been vulcanized by an ordinary method is halogenated by a conventional method, then the top thereof is sprayed or coated with at least one modified polyamide resin according to the present invention and the assembly is heated and cross-link or cure, whereby the desired light weight pneumatic tire is produced.

In the process of production of the pneumatic tire according to the third aspect of the present invention, it is possible to halogenate the surface of the carcass layer or the rubber layer on the top thereof by an ordinary method. This halogenation treatment may be performed, for example, using a chlorine solution, bromine solution, iodine solution, etc. for halogenation of general rubber. Examples such a solution are an aqueous solution containing chlorine, bromine, or iodine or a dilute aqueous solution of 12N hydrochloric acid. Further, it is preferable to use a dilute solution of a compound containing —N(X)C(O)— groups (wherein X is a halogen) in an organic solvent. Specific examples of such compounds are trichloro, dichloro, or monochloro isocyanuric acid. Use of a solution of 2 to 20% by weight of trichloroisocyanuric acid in an organic solvent (e.g., a solution of a ketone organic solvent such as methyl ethyl ketone or a solution of an ester organic solvent such as ethyl acetate) is most preferred.

The material of the rubber layer for bonding with the air permeation preventive layer according to the third aspect of the present invention is not particularly limited. Any rubber material which has been generally used as a rubber material for a tire in the past may be used. Examples of such a rubber are rubber compositions composed of diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The cured or cross-linked air permeation preventive layer according to the third aspect of the present invention has a melting point of 80° C. or more, preferably 100° C. or more, and an air permeation coefficient of $25 \times 10^{-12}$ cc·cm/cm²·sec·cmHg (at 30° C.) or less, preferably $5 \times 10^{-12}$ cc·cm/cm²·sec·cmHg (at 30° C.) or less. When the air permeation coefficient is $25 \times 10^{-12}$ cc·cm/cm²·sec·cmHg (at 30° C.) or less, the thickness of the inner liner layer can be ½ or less of the thickness of the conventional inner liner layers.

On the other hand, the Young's modulus is 1 to 500 MPa, preferably 10 to 300 MPa, and the thickness is 0.01 to 1.0 mm, preferably 0.02 to 0.5 mm. When the Young's modulus is less than 1 MPa, wrinkles will form at the time of forming the tire, whereby handling will become difficult, while when more than 500 MPa, it is not possible for the film to follow the deformation of the tire during use.

According to the fourth aspect of the present invention, there is provided a pneumatic tire having an air permeation preventive layer comprising a thin film of a vinylidene chloride-acrylonitrile copolymer formed by copolymerizing 5 to 50 molar % of acrylonitrile.

According to the fourth aspect of the present invention, there is further provided a process for producing a pneumatic tire comprising: spraying or coating a solution of the vinylidene chloride copolymer on a surface of a carcass layer of a green tire comprising unvulcanized rubber or the surface of a rubber layer such as an air permeation preventive layer composed of a low gas permeable rubber provided on the surface of the carcass layer which has been halogenated or the surface to which an adhesive has been coated, in place of the halogenation treatment (or in addition to the halogenation treatment), then vulcanizing the green tire, whereby an air permeation preventive layer is formed.

According to the fourth aspect of the present invention, there is further provided a process for producing a pneumatic tire comprising: spraying or coating the solution of the vinylidene chloride copolymer on a surface of a carcass layer of a vulcanized tire or the surface of a rubber layer such as an air permeation preventive layer composed of a low gas-permeable rubber provided on the surface of the carcass layer which has been halogenated or the surface to which an adhesive has been coated, in place of the halogenation treatment (or in addition to the halogenation treatment) to form an air permeation preventive layer by the vinylidene chloride copolymer.

The vinylidene chloride copolymer comprising the air permeation preventive layer in the fourth aspect of the present invention, as mentioned above, includes as essential components, a copolymer of vinylidene chloride and acrylonitrile wherein the content of the acrylonitrile is 5 to 50 molar %, based on the total copolymer, preferably 10 to 35 molar %. When the content of the acrylonitrile is too small, the result is poor in solubility in general solvents, while when too large, the Young's modulus becomes higher and not only is the result not practical, but it becomes hard to include a large amount of acrylonitrile in the synthesis of an actual copolymer. The vinylidene chloride-acrylonitrile copolymer further may be a three-way copolymer of vinylidene chloride, acrylonitrile, and vinyl chloride containing 5 to 15 molar % of vinyl chloride.

These vinylidene chloride copolymers are, for example, soluble in solvents such as xylene, toluene, methyl ethyl ketone, and tetrahydrofuran, ester solvents such as ethyl acetate and butyl acetate, and mixed solvents of the same.

When the air permeation preventive layer is constructed in accordance with the fourth aspect of the present invention, it is sufficient to mix the vinylidene chloride-acrylonitrile copolymer resin in a suitable solvent such as mentioned above and then to coat it. The concentration of the vinylidene chloride copolymer in the solution is not particularly limited so long as it does not hinder the coating, but preferably it is 3 to 50% by weight, more preferably 5 to 30% by weight. When the concentration is too low, the amount of the adhering resin is small and the result is not practical, while conversely when too large, the solution viscosity becomes high and the working or processing becomes difficult. The vinylidene chloride-acrylonitrile copolymer in accordance with the present invention has, with a thickness after curing of 10 to 50 $\mu$m, an air permeation coefficient of $25 \times 10^{-12}$ cc·cm/cm²·sec·cmhg (at 30° C.) or less, an elongation after vulcanization of 10% or more and before vulcanization of 110% or more, and an elasticity of 1 to 500 MPa. As the vinylidene chloride copolymer, for example, Dow Chemical's Saran F-310 (acrylonitrile content: 30 mol %) may be used. In this case, the values are 550% and 2 MPa, respectively.

Regarding the first production process of the pneumatic tire according to the fourth aspect of the present invention, the case where the inner liner layer 3 is arranged at the inside of the carcass layer 2 as shown in FIG. 1, the inner surface of the carcass layer of a green tire comprising unvulcanized rubber is halogenated or coated with an adhesive, the top thereof is sprayed or coated with the vinylidene chloride-acrylonitrile copolymer in a solution state or dispersion states, then the green tire is vulcanized by an ordinary method, whereby the desired light weight pneumatic tire is produced. Note that the same procedure may be followed when the inner liner layer is provided at the outer circumference of the carcass layer.

On the other hand, when the air permeation preventive layer is arranged at the surface (that is, the inner circumference) of the carcass layer of a vulcanized tire in accordance with the present invention, the surface of the vulcanized carcass layer which has been vulcanized by an ordinary method is halogenated or coated with an adhesive, instead of the halogenation treatment (or in addition to the halogenation treatment), then the top is sprayed or coated with the liquid composition according to the present invention and heating is applied, if necessary, to quickly form the thin film, whereby the desired light weight pneumatic tire having the air permeation preventive layer is produced.

In the production process of the pneumatic tire according to the fourth aspect of the present invention, it is possible to halogenate the surface of the carcass layer by a generally performed method. For example, it is possible to use a chlorine solution, bromine solution, iodine solution, etc. for halogenation of general rubber. Examples of a solution for chlorination, are a solution of trichloroisocyanuric acid/ MEK (methyl ethyl ketone) in a weight ratio of 95/5. Here, the ratio of mixture of the trichloroisocyanuric acid and MEK may of course be changed in accordance with the application. Further, ethyl acetate may be used, instead of MEK.

Examples of the adhesive to be coated on the surface of the carcass layer in the production process of a pneumatic tire according to the fourth aspect of the present invention are a reactive adhesive such as those which undergones a bonding reaction with the rubber of the carcass layer and the resin of the air permeation preventive layer during the vulcanization by the heat of vulcanization such as a phenol resin adhesive, a chlorinated rubber adhesive, or an isocyanate adhesive.

Examples of preferable examples of these adhesives are phenol resin types (e.g., Chemlock 234B made by LORD Co.), chlorinated rubber types (e.g., Chemlock 205 made by LORD Co.), isocyanate type (e.g., Chemlock 402 made by LORD Co.), etc. The amount of the adhesive used is as in the past and is not particularly limited.

The material of the rubber layer for bonding with the air permeation preventive layer according to the fourth aspect of the present invention is not particularly limited. Any rubber material which has been generally used as a rubber material for a tire in the past may be used. Examples of such a rubber are rubber compositions composed of diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The air permeation preventive layer according to the fourth aspect of the present invention has a softening point of 80° C. or more, preferably 100° C. or more, an air permeation coefficient of $25 \times 10^{-12}$ cc·cm/cm$^2$·sec·cmHg (at 30° C.) or less, preferably $0.05 \times 10^{-12}$ to $10 \times 10^{-12}$ cc·cm/ cm$^2$·sec·cmHg (at 30° C.) or less. When the air permeation coefficient is $25 \times 10^{-12}$ cc·cm/cm$^2$·sec·cmHg (at 30° C.) or less, the thickness of the air permeation preventive layer can be made ½ or less of the thickness of the conventional air permeation preventive layers.

On the other hand, the Young's modulus is 1 to 500 MPa, preferably 10 to 300 MPa. When the Young's modulus is less than 1 MPa, then wrinkles will form at the time of forming the tire, whereby handling will become difficult, while when more than, 500 MPa, it is not possible for the film to follow the deformation of the tire during use.

EXAMPLES

The present invention will now be further illustrated by, but is by no means limited to, the following Examples.

Examples I-1 to I-24 and Comparative Examples I-1 to I-3

Examples I-1 to I-11 are Examples of coating an alkoxy-alkylated aliphatic polyamide resin before vulcanization of the tire. The inner surface of a green tire molded by an ordinary method and composed of unvulcanized rubber is spray-coated by an adhesive, dried at room temperature for 30 minutes, then spray-coated with a solution composed of a mixed solvent of 70% by weight of methanol and 30% by weight of methyl ethyl ketone in which has been dissolved an alkoxyalkylated aliphatic polyamide resin in a proportion of 20% by weight. This is blown on by hot air of 80° C. for 2 minutes, then vulcanized by a tire vulcanizer at 185° C. for 15 minutes at a pressure of 2.3 MPa.

Examples I-12 to I-24 and Comparative Example I-3 are examples of coating an adhesive in the same way on the inner surface of a tire vulcanized by an ordinary method under the same type of vulcanization conditions as above, followed by spray-coating with a solution prepared in the same way as mentioned above and cross-linking or curing in accordance with the cross-linking and curing conditions shown in Table II.

Comparative Examples I-1 to I-2 are examples of not coating an adhesive, but halogenating the inner surface of an unvulcanized green tire or vulcanized tire (brush-coating a 3.3% solution of trichloroisocyanuric acid in ethyl acetate and drying for 2 hours). The vulcanization conditions were similar to those mentioned above.

Further, the standard Example of a tire used a butyl rubber composition of the following formulation as an inner liner layer:

Formulation of Butyl Rubber Compound
(Unit: Parts by Weight)

| | |
|---|---|
| Br-IIR | 100 |
| Carbon black (GPF) | 60 |
| Stearic acid | 1 |
| Petroleum based hydrocarbon resin*1 | 10 |
| Paraffinic process oil | 10 |
| Zinc oxide | 3 |
| DM | 1 |
| Sulfur | 0.6 |

*1: Escorez 1102 made by Esso Chemical.

The methods of evaluation used in the following Examples were as follows:

Method of Preparation of Alkoxyalkylated Aliphatic Polyamide Resin Solution Used in Tire The polymers, cross-linking agents, and other additives shown in the following formulations 1 to 8 were dissolved in a mixed solvent of 30% by weight of methyl ethyl ketone and 70% by weight of methanol to give polymer concentrations of 30% by weight.

The formulations used were as shown in the following formulations 1 to 3 and formulation 8:

| | Formulation 1 | Formulation 2 | Formulation 3 | Formulation 8 |
|---|---|---|---|---|
| Polymer A*1 | 100 | 100 | 100 | — |
| Polymer B*2 | — | — | — | 100 |
| Sulfur | 1.5 | — | — | 1.5 |
| Peroxide (di-cumylperoxide) | — | 1.0 | — | — |
| Sulfur-releasing-agent (tetra-methylthiuram disulfide) | — | — | 1.5 | — |
| DM | 3.0 | — | — | 3.0 |
| M | 2.0 | — | — | 2.0 |
| MZ | 2.0 | — | — | 2.0 |
| SnCl$_2$ | 1.0 | — | — | 1.0 |

*1: Polymer A: Polymer A was formulated as follows in accordance with the method described in Japanese Unexamined Patent Publication (Kokai) No. 51-24657, page 3, bottom right column, Production Example (2) (parts are parts by weight).
*2: Polymer B: Polymer B was synthesized as follows (parts are all parts by weight).

A 500 parts amount of nylon 6 and 2000 parts of formic acid were placed in a reactor provided with a reflux cover and were fully stirred to make a homogeneous. solution. 3 parts of phenol and 10 parts of N-methylolacrylamide were added and the stirring continued for 30 minutes while holding the temperature at 70° C. During this process, the N-methylolacrylamide and >NH groups included in the nylon 6 molecule engaged in a dehydrogenation condensation reaction.

Separately, 10 parts of KOH were added to 3000 parts of methanol held at 60° C. and a homogeneous solution made, then 2500 parts of para-formaldehyde were added to cause complete dissolution. The N-methoxymethylation reaction was completed, while gradually adding this to the above nylon 6 formic acid solution.

At this time, the temperature of the reaction system became 60 to 64° C. Further, the time until the end of the addition of the methanol-para-formaldehyde solution was made 10 to 15 minutes and the reaction was made to complete in 60 minutes from the start of the addition.

The resultant reaction solution was poured into water and the target substance was removed. This was fully washed with water, then dried. The result was a flexible substance having a good elasticity.

A 500 parts amount of nylon 66 and 2000 parts of formic acid were placed in a reactor provided with a reflux cover and were fully stirred to make a homogeneous solution. A 3 parts amount of phenol and 10 parts of N-methylolacrylamide were added and the stirring continued for 30 minutes, while holding the temperature at 70° C. During this process, the N-methylolacrylamide and >NH groups contained in the nylon 66 molecule caused a dehydrogenation condensation reaction.

|  | Formulation 4 | Formulation 5 |
| --- | --- | --- |
| Luckamide 5003[*1] | 100 | 100 |
| Epicoat #828[*2] (epoxide group) | 15 | 30 |
| Sebacic acid dihydrazide (curing agent) | 3.5 | 7.5 |

[*1]: Luckamide 5003: Dainippon Ink nylon 8/nylon 6 based methoxymethylated aliphatic polyamide resin (amide conversion rate of at least 28%)
[*2]: Epicoat #828: Bisphenol A diglycidyl ether (Shell Chemical)

|  | Formulation 6 | Formulation 7 |
| --- | --- | --- |
| Luckamide 5003 | 100 | 100 |
| Hitanol 1502[*1] | 12 | — |
| Takkirol 250-1[*2] | — | 20 |
| Zinc oxide | 3 | 3 |
| Boric acid | 1 | — |

[*1]: Hitanol 1502: Resol type phenolic resin of molecular weight of about 800 (made by Hitachi Kasei Co.)
[*2]: Takkirol 250-1: Brominated alkylphenolformaldehyde resin (made by Taoka Kagaku Kogyo)

Preparation of Film Sample

Solutions of alkoxyalkylated aliphatic polyamide resin of the formulations of Examples and Comparative Examples dissolved in a proportion of 20% by weight in a mixed solvent of 70% by weight of methanol and 30% by weight of methyl ethyl ketone were formed into films by the film casting method (uniformly casting a polymer solution on an endless belt, continuously drying it by blowing hot air of 60 to 90° C., then peeling to form a film). After drying, these were allowed to stand in a 130° C. heater for 15 minutes for a cross-linking or curing reaction. (Film: thickness of approximately 100 μm)

Method for Measurement of Melting Point

A differential scan calorimeter (DSC) was used, the temperature raised at 10° C./min, and the endothermic peak temperature caused by the melting point was read or, when the peak was unclear, a thermal mechanical analysis (TMA) apparatus was used, a compression test was performed at a load of 5 g, and the melting point was read from the temperature of the point of inflexion.

Measurement of Air Permeation Coefficient of Air Permeation Preventive Layer

According to JIS K7126 "Test Method of Gas Permeability of Plastic Films and Sheets (Method A)".

Test piece: Samples of films prepared in the examples used.

Test gas: Air ($N_2:O_2=8:2$)

Test temperature: 30° C.

Method for Measurement of Young's Modulus of Film

According to JIS K6251 "Tensile Test Method of Vulcanized Rubber".

Test piece: The film samples prepared above were punched into JIS No. 3 dumbbell shapes in parallel to the direction of flow of the solution (direction of flow of endless belt). A tangent was drawn to the curve of the initial strain area of the resultant stress-strain curve and the Young's modulus was found from the inclination of the tangent.

Method for Measurement of Peeling Strength of Air Permeation Preventive Layer/Carcass Layer According to JIS K6258 "Test Method of Bonding of Vulcanized Rubber".

Test piece: A finished tire was disassembled and short strips of a width of 25 mm were punched out in the direction of arrangement of the carcass cord.

Test temperature: 20° C.

Test: The inner liner layer and carcass layer of a sample were partially peeled apart in advance. The layers of the sample were gripped in the chucks of a tensile tester and were peeled apart at the following tensile rate: 50.0±5.0 mm/min Method for Testing Long Term Durability A 165SR13 steel radial tire (rim 13×4 ½-J) was used, was mounted on a 1500 cc class passenger car at an air pressure of 200 kPa, was subjected to a load corresponding to four passengers (65 kg/person), and was run on actual roads for 20,000 km.

After use, the tire was removed from the rim and the liner layer at the inside surface of the tire was visually examined. Liner layers with cracks, visible wrinkles, or peeled or blistered liner layers were judged as failing and those without them as passing.

The test was designed to evaluate as a whole the deterioration of strength, deterioration of bonding, etc. of the liner layer by actual cars.

Method for Testing Long Term Water Resistance and Resistance to Moisture Absorption A 165SR13 steel radial tire (rim 13×4½-J) was used and run on a φ1707 mm drum at a speed of 80 km/h at an air pressure of 200 kPa, a load of 5.5 kN, and a room temperature of 38° C. After 10,000 km, the inside surface of the tire was visually examined. Liner layers with cracks, visible wrinkles, or peeled or blistered liner layers were judged as failing and those without them as passing.

Note that just before the test run, the tire was allowed to stand for 10 days at a relative humidity of 98% and a room temperature of 70° C.

Method for Testing Tire Air Leakage Performance

A 165SR13 steel radial tire (rim 13×4 ½-J) was used, allowed to stand at an initial pressure of 200 kPa under no-load conditions at room temperature 21° C. for 3 months, and measured as to pressure every four day interval.

When the measured pressure is Pt, the initial pressure is Po, and the number of days elapsed is t, the value α is found by recurrence of the function:

$$Pt/Po = \exp(-\alpha t)$$

The α obtained is used and t=30 substituted in the following formula to obtain β:

$$\beta = [1 - \exp(-\alpha t)] \times 100$$

This value β is considered the rate of reduction of pressure per month (%/month).

| Formulation of Rubber for Tire Carcass | |
|---|---|
| Ingredient | Parts by weight |
| Natural rubber | 80.0 |
| SBR 1502 | 20.0 |
| FEF carbon black | 50.0 |
| Stearic acid | 2.0 |
| Zinc oxide | 3.0 |
| Sulfur | 3.0 |
| Vulcanization accelerator (NS) | 1.0 |
| Aromatic oil | 2.0 |

The results for the evaluation are shown in Table I-1 and Table I-2.

TABLE I-1

| | Standard ex. | Comp. Ex. I-1 | Ex. I-1 | Ex. I-2 | Ex. I-3 | Ex. I-4 | Ex. I-5 | Ex. I-6 |
|---|---|---|---|---|---|---|---|---|
| Material of air permeation preventive layer | Butyl rubber | Alkoxyalkylated aliphatic polyamide resin | | | | | | |
| Step of coating air permeation preventive layer | — | Before tire vulcanization | | | | | | |
| Type of polyamide/Amount of polyamide (parts) | — | Luckamide 100 | Luckamide 100 | Luckamide 100 | Luckamide 100 | Polymer A 100 | Polymer A 100 | Polymer B 100 |
| Method of bonding rubber and polyamide | | | | | | | | |
| Halogenation | — | Yes | — | — | — | — | — | — |
| Use of adhesive | — | — | Yes | Yes | Yes | Yes | Yes | Yes |
| Type of adhesive used | | | Chemlock 234B | Chemlock 205 | Chemlock 205 | Chemlock 402 | Chemlock 402 | Chemlock 234B |
| Cross-linking/curing of polyamide | — | Yes | No | Yes | Yes | Yes | Yes | Yes |
| Cross-linking agent | | | | | | | | |
| Acid catalyst/Amount of catalyst (parts) | — | Tartaric acid 5 | — | Tartaric acid 5 | Citric acid 5 | — | — | — |
| Other than acid | — | — | — | — | — | Form. 1 | Form. 2 | Form. 8 |
| Air permeation coefficient of air permeation preventive layer ×10$^{-12}$ (cc·cm/cm$^2$·sec·cmHg) (30° C.) | 55 | 3.0 | 4.7 | 3.0 | 3.2 | 4.5 | 4.2 | 5.2 |
| Young's modulus of air permeation preventive layer (MPa) (23° C.) | 15 | 252 | 245 | 252 | 240 | 275 | 290 | 380 |
| Peeling strength of air permeation preventive layer/carcass layer (N/cm) (23° C.) | 40 | 20 | 38 | 42 | 43 | 45 | 42 | 45 |
| Long term durability test | Passed | Failed Liner peeling | Passed | Passed | Passed | Passed | Passed | Passed |
| Tire air leakage performance (%/month) | 3.0 | 1.9 | 2.7 | 1.9 | 2.0 | 2.6 | 2.5 | 2.9 |
| Thickness of air permeation preventive layer (mm) | 0.50 | 0.05 | 0.05 | 0.05 | 0.05 | 0.05 | 0.05 | 0.05 |
| Mass of air permeation preventive layer (g) | 480 | 48 | 47 | 48 | 48 | 48 | 47 | 48 |
| Melting point of air permeation preventive layer (° C.) | — | 160 | 152 | 160 | 160 | 155 | 157 | 160 |

| | Standard ex. | Ex. I-7 | Ex. I-8 | Ex. I-9 | Ex. I-10 | Ex. I-11 |
|---|---|---|---|---|---|---|
| Material of air permeation preventive layer | Butyl rubber | Alkoxyalkylated aliphatic polyamide resin | | | | |
| Step of coating air permeation preventive layer | — | Before tire vulcanization | | | | |
| Type of polyamide/Amount of polyamide (parts) | — | Polymer A 100 | Luckamide 100 | Luckamide 100 | Luckamide 100 | Luckamide 100 |

TABLE I-1-continued

| Method of bonding rubber and polyamide | | | | | | |
|---|---|---|---|---|---|---|
| Halogenation | — | — | — | — | — | — |
| Use of adhesive | — | Yes | Yes | Yes | Yes | Yes |
| Type of adhesive used | — | Chemlock 402 | Chemlock 234B | Chemlock 234B | Chemlock 205 | Chemlock 205 |
| Cross-linking/curing of polyamide | — | Yes | Yes | Yes | Yes | Yes |
| Cross-linking agent | | | | | | |
| Acid catalyst/Amount of catalyst (parts) | — | — | — | — | Form. 6 | — |
| Other than acid | — | Form. 3 | — | — | — | Form. 7 |
| Curable resin | — | — | Form. 4 | Form. 5 | — | — |
| Air permeation coefficient of air permeation preventive layer $\times 10^{-12}$ (cc · cm/cm$^2$ · sec · cmHg) (30° C.) | 55 | 4.5 | 3.8 | 3.5 | 3.4 | 3.3 |
| Young's modulus of air permeation preventive layer (MPa) (23° C.) | 15 | 280 | 340 | 364 | 487 | 430 |
| Peeling strength of air permeation preventive layer/carcass layer (N/cm) (23° C.) | 40 | 44 | 45 | 45 | 42 | 44 |
| Long term durability test | Passed | Passed | Passed | Passed | Passed | Passed |
| Tire air leakage performance (%/month) | 3.0 | 2.6 | 2.3 | 2.2 | 2.1 | 2.1 |
| Thickness of air permeation preventive layer (mm) | 0.50 | 0.05 | 0.05 | 0.05 | 0.05 | 0.05 |
| Mass of air permeation preventive layer (g) | 480 | 48 | 47 | 48 | 48 | 48 |
| Melting point of air permeation preventive layer (° C.) | — | 160 | 178 | 175 | 170 | 170 |

(Note) Tire size: 165SR13 steel radial tire.

TABLE I-2

| | Standard ex. | Comp. Ex. I-2 | Ex. I-12 | Ex. I-13 | Ex. I-14 | Ex. I-15 | Ex. I-16 | Ex. I-17 |
|---|---|---|---|---|---|---|---|---|
| Material of air permeation preventive layer | Butyl rubber | Alkoxyalkylated aliphatic polyamide resin | | | | | | |
| Step of coating air permeation preventive layer | — | After tire vulcanization | | | | | | |
| Type of polyamide/Amount of polyamide (parts) | — | Luckamide 100 | Luckamide 100 | Luckamide 100 | Luckamide 100 | Luckamide 100 | Luckamide 100 | Polymer B 100 |
| Method of bonding rubber and polyamide | | | | | | | | |
| Halogenation | — | Yes | — | — | — | — | — | — |
| Use of adhesive | — | — | Yes | Yes | Yes | Yes | Yes | Yes |
| Type of adhesive used | — | — | Chemlock 234B | Chemlock 234B | Chemlock 234B | Chemlock 205 | Chemlock 205 | Chemlock 234B |
| Cross-linking/curing of polyamide | — | Yes | No | Yes | Yes | Yes | Yes | Yes |
| Cross-linking agent | | | | | | | | |
| Acid catalyst/Amount of catalyst (parts) | — | Tartaric acid 5 | — | Tartaric acid 5 | Tartaric acid 5 | Citric acid 5 | Citric acid 5 | — |
| Other than acid | — | — | — | — | — | — | — | Form. 8 |
| Cross-linking/curing heat treatment conditions | — | 160° C. × 5 min | — | 160° C. × 5 min | 180° C. × 10 min | 160° C. × 5 min | 180° C. × 10 min | 160° C. × 10 min |
| Air permeation coefficient of air permeation preventive layer $\times 10^{-12}$ (cc · cc/cm$^2$ · sec · cmHg) (30° C.) | 55 | 3.0 | 4.7 | 3.0 | 3.0 | 3.2 | 3.2 | 5.2 |
| Young's modulus of air permeation preventive layer (MPa) (23° C.) | 15 | 252 | 145 | 252 | 330 | 240 | 318 | 360 |
| Melting point of air permeation preventive layer (° C.) | — | 160 | 152 | 150 | 160 | 155 | 157 | 160 |
| Peeling strength of air permeation preventive layer/carcass layer (N/cm) (23° C.) | 40 | 28 | 32 | 34 | 35 | 34 | 34 | 38 |
| Long term durability test | Pass | Failed Liner peeling | Passed | Passed | Passed | Passed | Passed | Passed |
| Tire air leakage performance (%/month) | 3.0 | 2.9 | 2.7 | 2.9 | 2.5 | 3.0 | 2.8 | 2.9 |
| Thickness of air permeation preventive layer (mm) | 0.50 | 0.05 | 0.05 | 0.05 | 0.05 | 0.05 | 0.05 | 0.05 |
| Mass of air permeation preventive layer (g) | 480 | 47 | 47 | 48 | 49 | 48 | 49 | 48 |

TABLE I-2-continued

| | Standard ex. | Ex. I-18 | Ex. I-19 | Ex. I-20 | Ex. I-21 | Ex. I-22 | Ex. I-23 | Ex. I-24 | Comp. Ex. I-3 |
|---|---|---|---|---|---|---|---|---|---|
| Material of air permeation preventive layer | Butyl rubber | Alkoxyalkylated aliphatic polyamide resin | | | | | | | |
| Step of coating air permeation preventive layer | — | After tire vulcanization | | | | | | | |
| Type of polyamide/Amount of polyamide (parts) | — | Polymer A 100 | Polymer A 100 | Polymer A 100 | Luckamide 100 | Luckamide 100 | Luckamide 100 | Luckamide 100 | Polymer C*1 100 |
| Method of bonding rubber and polyamide | | | | | | | | | |
| Halogenation | — | — | — | — | — | — | — | — | — |
| Use of adhesive | — | Yes | Yes | Yes | Yes | Yes | Yes | Yes | Yes |
| Type of adhesive used | — | Chemlock 402 | Chemlock 402 | Chemlock 402 | Chemlock 234B | Chemlock 234B | Chemlock 205 | Chemlock 205 | Chemlock 205 |
| Cross-linking/curing of polyamide | — | Yes | Yes | Yes | Yes | Yes | Yes | Yes | Yes |
| Cross-linking agent | | | | | | | | | |
| Acid catalyst/Amount of catalyst (parts) | — | — | — | — | — | — | — | Form. 6 | — | — |
| Other than acid | — | Form. 1 | Form. 2 | Form. 3 | — | — | — | Form. 7 | Form. 1 |
| Curable resin | — | — | — | — | Form. 4 | Form. 5 | — | — | — |
| Cross-linking/curing heat treatment conditions | — | 160° C. × 10 min | 160° C. × 10 min | 160° C. × 10 min | 130° C. × 10 min | 130° C. × 10 min | 160° C. × 10 min | 160° C. × 10 min | 160° C. × 10 min |
| Air permeation coefficient of air permeation preventive layer ×10$^{-12}$ (cc · cm/cm$^2$ · sec · cmHg) (30° C.) | 55 | 4.5 | 4.2 | 4.5 | 3.8 | 3.5 | 3.4 | 3.3 | 4.5 |
| Young's modulus of air permeation preventive layer (MPa) (23° C.) | 15 | 222 | 240 | 236 | 340 | 364 | 487 | 430 | 222 |
| Peeling strength of air permeation preventive layer/carcass layer (N/cm) (23° C.) | 40 | 40 | 42 | 38 | 42 | 40 | 38 | 39 | 40 |
| Long term durability test | Passed | Passed | Passed | Passed | Passed | Passed | Passed | Passed | Failed |
| Tire air leakage performance (%/month) | 3.0 | 2.6 | 2.5 | 2.6 | 2.3 | 2.2 | 2.1 | 2.1 | 2.6 |
| Thickness of air permeation preventive layer (mm) | 0.50 | 0.05 | 0.05 | 0.05 | 0.05 | 0.05 | 0.05 | 0.05 | 0.05 |
| Mass of air permeation preventive layer (g) | 480 | 48 | 47 | 47 | 49 | 50 | 49 | 49 | 48 |
| Melting point of air permeation preventive layer (° C.) | — | 155 | 157 | 160 | 178 | 175 | 170 | 170 | 75 |

(Note) Tire size: 165SR13 steel radial tire.
*1: Polymer C: Synthesized by a method similar to the Polymer B but making the reacted nylon a nylon 6/66/610/12.

As explained above, according to the first aspect of the present invention, it is possible to obtain a pneumatic tire having an air permeation preventive layer which enables the weight of the tire to be reduced while maintaining an excellent air pressure retention in the tire and which is superior in bonding with a rubber layer.

Examples II-1 to II-8 and Comparative Examples II-1 to II-4

Examples II-1 to II-4 and Comparative Examples II-1 to II-2 are examples of coating a multi component copolymer polyamide resin composition before vulcanization of the tire. The inner surface of a green tire molded by an ordinary method and comprised of unvulcanized rubber is halogenated (brush-coated with a 3.3% solution of trichloroisocyanuric acid in ethyl acetate and then dried for 2 hours) or coated with an adhesive (brush coated and dried for 2 hours), then was spray-coated by a solution comprised of a mixed solvent of 70% by weight of methanol and 30% by weight of methyl ethyl ketone in which has been dissolved a multi component copolymer polyamide resin in a proportion of 20% by weight (in the Examples, a curable resin and curing agent were added). This is blown on by hot air of 80° C. for 2 minutes, then vulcanized by a tire vulcanizer at 185° C. for 15 minutes at a pressure of 2.3 MPa.

Examples II-5 to II-8 and Comparative Examples II-3 to II-4 are Examples of halogenation or coating an adhesive in the same way on the inner surface of a tire vulcanized by an ordinary method under the same type of vulcanization conditions as above, then spray-coating it with a solution prepared in the same way as above and curing in accordance with the nylon curing heat treatment conditions or adhesive curing conditions shown in Table II-2.

Further, the standard Example of a tire used a butyl rubber composition of the following formulation as an inner liner layer:

Formulation of Butyl Rubber Compound

| Br-IIR | 100 |
| Carbon black (GPF) | 60 |
| Stearic acid | 1 |
| Petroleum based hydrocarbon resin*1 | 10 |
| Paraffinic process oil | 10 |

|  |  |
| --- | --- |
| Zinc oxide | 3 |
| DM | 1 |
| Sulfur | 0.6 |

*1: Escorez 1102 made by Esso Chemical.

The methods of evaluation used in the following examples were as follows:

Method for Preparation of Multi Component Copolymer Polyamide Resin Solution Used in Tire The nylons, curable resins, curing agents, etc. shown in Tables II-1 and II-2 were dissolved in a mixed solvent of 30% by weight of methyl ethyl ketone and 70% by weight of methanol to give a polyamide resin/epoxy resin formulation of 30% by weight.

Preparation for Film Sample

Multi component copolymer nylon solutions of the formulations of Examples and Comparative Examples dissolved in a proportion of 20% by weight in a mixed solvent of 70% by weight of methanol and 30% by weight of. methyl ethyl ketone were formed into films by the film casting method (uniformly casting a polymer solution on an endless belt, continuously drying it by blowing hot air of 60 to 90° C., then peeling to form a film). After drying, these films were allowed to stand in a 130° C. heater for 10 minutes to cure. (Film: thickness of approximately 100 μm)

Measurement of Air Permeation Coefficient of Air Permeation Preventive Layer

See above.

Method for Measurement of Young's Modulus of Air Permeation Preventive Layer

See above.

Method for Measurement of Melting Point

See above.

Existence of Destruction of Air Permeation Preventive Layer After Vulcanization

The multi component copolymer polyamide resin solution was coated on a green tire, then the tire was vulcanized. The surface of the polyamide resin layer was visually examined to determine the existence of bubbling, flowing, or other destruction.

Method for Measurement of Peeling Strength of Air Permeation Preventive Layer/Carcass Layer See above.

Method for Testing Long Term Durability

See above.

Method for Testing Long Term Heat Resistance

A 165SR13 steel radial tire (rim 13×4 ½-J) was used and run on a ϕ1707 mm drum at a speed of 140 km/h at an air pressure of 250 kPa, a load of 2.5 kN, and a room temperature of 45° C.

After 25,000 km, the tire was removed from the rim and the liner layer at the inside surface of the tire was visually examined. Liner layers with cracks, visible wrinkles, or peeled or blistered liner layers were judged as failing and those without them as passing. Note that just before the test run, the tire was allowed to stand for 14 days at a room temperature of 80° C. or more.

The test was designed to recreate on an indoor drum and evaluate as a whole the durability due to heat degradation of the liner layer.

Method for Testing Tire Air Leakage Performance

See above.

The results obtained are shown in the following Tables.

TABLE II-1

Example of Coating of Multi Component Copolymer Nylon Before Vulcanization of Tire
(Tire Size: 165SR13 Steel Radial Tire)

|  | Comp. Ex. II-1 | Ex. II-1 | Ex. II-2 | Comp. Ex. II-2 | Ex. II-3 | Ex. II-4 | Standard Ex. |
| --- | --- | --- | --- | --- | --- | --- | --- |
| Material of air permeation preventive layer | Multi component copolymer nylon resin | | | | | | Butyl rubber |
| Step of coating air permeation preventive layer | Before tire vulcanization | | | | | | — |
| Air permeation preventive layer/rubber bonding | Halogenation treatment | | | Adhesive | | | — |
| Type of adhesive | — | — | — | Chemlock 205 | Chemlock 402 | Chemlock 234B | — |
| Type of nylon | *1 | *1 | *2 | *2 | *1 | *2 | — |
| Amount of nylon (parts) | 100 | 100 | 100 | 100 | 100 | 100 | — |
| Curable resin/Epoxy resin*3 | — | 25 | 25 | — | 25 | 25 | — |
| Curing agent/dicyan diamide*4 | — | 10 | 10 | — | 10 | 10 | — |
| Air permeation coefficient of air permeation preventive layer ×$10^{-12}$ (cc · cm/cm$^2$ · sec · cmHg) (30° C.) | 3.5 | 3.0 | 3.2 | 4.0 | 3.0 | 3.2 | 55 |
| Young's modulus of air permeation preventive layer (MPa) (23° C.) | 230 | 450 | 420 | 210 | 450 | 420 | 15 |
| Melting point of air permeation preventive layer (° C.) | 150 | 180 | 180 | 85 | 120 | 120 | — |
| Destruction of air permeation preventive layer after vulcanization | Yes (bubbles) | No | No | Yes | No | No | No |
| Peeling strength of air permeation preventive layer/carcass layer (N/cm) (23° C.) | 32 | 31 | 31 | 42 | 41 | 42 | 40 |
| Long term water resistance/moisture absorption resistance | Failed | Passed | Passed | Failed | Passed | Passed | Passed |
| Long term durability test | Failed | Passed | Passed | Failed | Passed | Passed | Passed |
| Long term heat resistance test | Passed | Passed | Passed | Failed | Passed | Passed | Passed |
| Tire air leakage performance (%/month) | 2.2 | 1.9 | 2.0 | 2.4 | 1.0 | 2.0 | 3.0 |
| Thickness of air permeation preventive layer (mm) | 0.05 | 0.05 | 0.05 | 0.05 | 0.05 | 0.05 | 0.50 |
| Mass of air permeation preventive layer (g) | 47 | 49 | 48 | 47 | 49 | 47 | 480 |

*1: Nylon 6/66/610 made by Toray, CM4000;
*2: Nylon 6/66/610/12 made by Toray, CM8000;
*3: Epicoat 828: Bisphenol A diglycidyl ether (made by Shell Chemical);
*4: DICY15: made by Yuka Shell Epoxy.

TABLE II-2

Example of Coating of Multi Component Copolymer Nylon After Vulcanization of Tire
(Tire Size: 165SR13 Steel Radial Tire)

| | Comp. Ex. II-3 | Ex. II-5 | Ex. II-6 | Comp. Ex. II-4 | Ex. II-7 | Ex. II-8 | Standard Ex. |
|---|---|---|---|---|---|---|---|
| Material of air permeation preventive layer | Multi component copolymer nylon resin | | | | | | Butyl rubber |
| Step of coating air permeation preventive layer | After tire vulcanization | | | | | | — |
| Air permeation preventive layer/rubber bonding | Halogenation treatment | | | Adhesive | | | — |
| Type of adhesive | — | — | — | Chemlock 205 | Chemlock 402 | Chemlock 234B | — |
| Type of nylon | *1 | *1 | *2 | *2 | *1 | *2 | — |
| Amount of nylon (parts) | 100 | 100 | 100 | 100 | 100 | 100 | — |
| Curable resin/Epoxy resin*3 | — | 25 | 25 | — | 25 | 25 | — |
| Curing agent/dicyan diamide*4 | — | 10 | 10 | — | 10 | 10 | — |
| Nylon curing heat treatment conditions or adhesive curing conditions | — | 130° C. × 10 min | 130° C. × 10 min | 130° C. × 10 min | 130° C. × 10 min | 130° C. × 10 min | — |
| Air permeation coefficient of air permeation preventive layer ×10$^{-12}$ (cc · cm/cm$^2$ · sec · cmHg) (30° C.) | 3.5 | 3.0 | 3.2 | 4.0 | 3.0 | 3.2 | 55 |
| Young's modulus of air permeation preventive layer (MPa) (23° C.) | 230 | 450 | 420 | 210 | 450 | 420 | 25 |
| Melting point of air permeation preventive layer (° C.) | 150 | 180 | 180 | 85 | 120 | 120 | — |
| Destruction of air permeation preventive layer after vulcanization | Yes | No | No | Yes | No | No | No |
| Peeling strength of air permeation preventive layer/carcass layer (N/cm) (23° C.) | 25 | 22 | 23 | 34 | 32 | 33 | 40 |
| Long term water resistance/moisture absorption resistance | Failed | Passed | Passed | Failed | Passed | Passed | Passed |
| Long term durability test | Failed | Passed | Passed | Failed | Passed | Passed | Passed |
| Long term heat resistance test | Passed | Passed | Passed | Failed | Passed | Passed | Passed |
| Tire air leakage performance (%/month) | 2.4 | 2.0 | 2.2 | 2.6 | 2.1 | 2.2 | 3.0 |
| Thickness of air permeation preventive layer (mm) | 0.05 | 0.05 | 0.05 | 0.05 | 0.05 | 0.05 | 0.50 |
| Mass of air permeation preventive layer (g) | 47 | 49 | 48 | 47 | 49 | 47 | 480 |

*1: Nylon 6/66/610 made by Toray, CM4000;
*2: Nylon 6/66/610/12 made by Toray, CM8000;
*3: Epicoat 828: Bisphenol A diglycidyl ether (made by Shell Chemical);
*4: DICY15: made by Yuka Shell Epoxy.

As explained above, according to the second aspect of the present invention, it is possible to obtain a pneumatic tire having an air permeation preventive layer which enables the weight of the tire to be reduced while maintaining an excellent air pressure retention in the tire, which is superior in bonding with a rubber layer, and which is superior in water resistance (humidity resistance) and heat resistance)

Examples III-1 to III-16 and Comparative Examples III-1 to III-5

Examples III-1 to III-8 and Comparative Examples III-1 to III-2 are-examples of coating an alkoxyalkylated aliphatic polyamide resin before vulcanization of the tire. The inner surface of a green tire molded by an ordinary method and comprised of unvulcanized rubber was halogenated (brush-coated with a 3.3% solution of trichloroisocyanuric acid in ethyl acetate and then dried for 2 hours), then was spray-coated by a solution comprised of a mixed solvent of 70% by weight of methanol and 30% by weight of methyl ethyl ketone in which has been dissolved an alkoxyalkylated aliphatic polyamide resin in a proportion of 20% by weight, then was dried by .blowing hot air of 80° C. for 2 minutes, then the green tire was vulcanized by a tire vulcanizer at 185° C. for 15 minutes at a pressure of 2.3 MPa.

Examples III-9 to III-16 and Comparative Examples III-3 to III-5 are examples of halogenation in the same way on the inner surface of a tire vulcanized by an ordinary method under the same type of vulcanization conditions as above, then spray-coating it with a solution prepared in the same way as above and cross-linking and curing in accordance with the cross-linking and curing conditions shown in Table III-2.

Further, the standard example of a tire used a butyl rubber composition of the following formulation as an air permeation preventive layer:

Formulation of Butyl Rubber Compound (Unit: Parts by Weight)

| | |
|---|---|
| Br-IIR | 100 |
| Carbon black (GPF) | 60 |
| Stearic acid | 1 |
| Petroleum based hydrocarbon resin*1 | 10 |
| Paraffinic process oil | 10 |
| Zinc oxide | 3 |
| DM | 1 |
| Sulfur | 0.6 |

*1: Escorez 1102 made by Esso Chemical.

The methods for evaluation used in the following examples were as follows:

Method for Preparation of Alkoxyalkylated Aliphatic Polyamide Resin Solution Used in Tire The polymers, cross-linking agents, and other additives shown in the following formulations 1 to 8 were dissolved in a mixed solvent of 30% by weight of methyl ethyl ketone and 70% by weight of methanol to give polymer concentrations of 30% by weight.

The formulations used were as shown in the following formulation 1 to formulation 8:

|  | Formulation 1 | Formulation 2 | Formulation 3 | Formulation 8 |
|---|---|---|---|---|
| Polymer A*1 | 100 | 100 | 100 | — |
| Polymer B*2 | — | — | — | 100 |
| Sulfur | 1.5 | — | — | 1.5 |
| Peroxide (dicumylperoxide) | — | 1.0 | — | — |
| Sulfur-releasing-agent (tetramethylthiuram disulfide) | — | — | 1.5 | — |
| DM | 3.0 | — | — | 3.0 |
| M | 2.0 | — | — | 2.0 |
| MZ | 2.0 | — | — | 2.0 |
| $SnCl_2$ | 1.0 | — | — | 1.0 |

*1: Polymer A: Polymer A was formulated as follows in accordance with the method described in Japanese Unexamined Patent Publication (Kokai) No. 51-24657, page 3, bottom right column, Production Example (2) (parts are parts by weight).
*2: Polymer B: Polymer B was synthesized as follows (parts are all parts by weight).

A 500 parts amount of nylon 6 and 2000 parts of formic acid were placed in a reactor provided with a reflux cover and were fully stirred to make a homogeneous solution. A 3 parts by weight of phenol and 10 parts of N-methylolacrylamide were added and the stirring continued for 30 minutes while holding the temperature at 70° C. During this process, the N-methylolacrylamide and >NH groups included in the nylon 6 molecule caused in a dehydrogenation condensation reaction.

Separately, 10 parts of KOH were added to 3000 parts of methanol held at 60° C. and a homogeneous solution made, then 2500 parts of para-formaldehyde were added to cause complete dissolution. The N-methoxymethylation reaction was ended while gradually adding this in the above nylon 6 formic acid solution.

At this time, the temperature of the reaction system became 60 to 64° C. Further, the time until the end of the addition of the methanol-paraformaldehyde solution was made 10 to 15 minutes and the reaction was made to end in 60 minutes from the start of the addition.

The resultant reaction solution was poured into water and the target substance was removed. This was fully washed with water, then dried. The result was a flexible substance having a good elasticity.

A 500 parts by weight of nylon 66 and 2000 parts of formic acid were placed in a reactor provided with a reflux cover and were fully stirred to make a homogeneous solution. A 3 parts amount of phenol and 10 parts of N-methylolacrylamide were added and the stirring continued for 30 minutes while holding the temperature at 70° C. During this process, the N-methylolacrylamide and >NH groups included in the nylon 66 molecule caused a dehydrogenation condensation reaction.

|  | Formulation 4 | Formulation 5 |
|---|---|---|
| Luckamide 5003*1 | 100 | 100 |
| Epicoat #828*2 (epoxide group) | 15 | 30 |
| Sebacic acid dihydrazide (curing agent) | 3.5 | 7.5 |

*1: Luckamide 5003: Dainippon Ink nylon 8/nylon 6 based methoxymethylated aliphatic polyamide resin (amide conversion rate of at least 28%)
*2: Epicoat #828: Bisphenol A diglycidyl ether (Shell Chemical)

|  | Formulation 6 | Formulation 7 |
|---|---|---|
| Luckamide 5003 | 100 | 100 |
| Hitanol 1502*1 | 12 | — |
| Tackirol 250-1*2 | — | 20 |
| Zinc oxide | 3 | 3 |
| CR W*3 | 1 | — |

*1: Hitanol 1502: Resol type phenol resin of molecular weight of about 800 (made by Hitachi Kasei Co.)
*2: Tackirol 250-1: Brominated alkylphenolformaldehyde resin (made by Taoka Kagaku Kogyo)
*3: Chloroprene rubber Neoprene W: made by Showa Denko Dupont Co.

Preparation of Film Sample

Solutions of alkoxyalkylated aliphatic polyamide resin of the formulations of Examples and Comparative Examples dissolved in a proportion of 20% by weight in a mixed solvent of 70% by weight of methanol and 30% by weight of methyl ethyl ketone were formed into films by the film casting method (uniformly casting a polymer solution on an endless belt, continuously drying it by blowing hot air of 60 to 90° C., then peeling to form a film). After drying, these were allowed to stand in a 130° C. heater for 15 minutes for a cross-linking or curing reaction. (Film: thickness of approximately 100 μm)

Measurement of Air Permeation Coefficient of Air Permeation Preventive Layer

See above.

Method for Measurement of Young's Modulus of Air Permeation Preventive Layer

See above.

Method for Measurement of Melting Point

See above.

Existence of Destruction of Air Permeation Preventive Layer After Vulcanization

The alkoxyalkylated aliphatic polyamide resin solution was coated on a green tire, then the tire was vulcanized. The surface of the polyamide was visually examined to determine the existence of bubbling, flowing, or other destruction.

Method for Measurement of Peeling Strength of Air Permeation Preventive Layer/Carcass Layer See above.

Method for Testing Long Term Durability

See above.

Method for Testing Long Term Heat Resistance

See above.

Method for Testing Tire Air Leakage Performance

See above.

Formulation of Rubber for Tire Carcass

| Ingredient | Parts by weight |
|---|---|
| Natural rubber | 80.0 |
| SBR 1502 | 20.0 |
| FEF carbon black | 50.0 |
| Stearic acid | 2.0 |
| Zinc oxide | 3.0 |
| Sulfur | 3.0 |
| Vulcanization accelerator (NS) | 1.0 |
| Aromatic oil | 2.0 |

The results of the evaluation are shown in Table III-1 and Table III-2.

TABLE III-1

| | Standard ex. | Comp. Ex. III-1 | Comp. Ex. III-2 | Ex. III-1 | Ex. III-2 | Ex. III-3 |
|---|---|---|---|---|---|---|
| Material of air permeation preventive layer | Butyl rubber | Alkoxyalkylated aliphatic polyamide resin | | | | |
| Step of coating air permeation preventive layer | — | Before tire vulcanization | | | | |
| Type of polyamide/Amount of polyamide (parts) | — | Luckamide 100 | Luckamide 100 | Polymer A 100 | Polymer A 100 | Polymer A 100 |
| Cross-linking or curing of polyamide | — | No | Yes | Yes | Yes | Yes |
| Cross-linking agent | — | — | Citric acid 5 | — | — | — |
| Acid catalyst/Amount of catalyst (parts) | — | — | — | Form. 1 | Form. 2 | Form. 3 |
| Other than acid Curable resin | — | — | — | — | — | — |
| Air permeation coefficient of air permeation preventive layer ×$10^{-12}$ (cc · cm/cm² · sec · cmHg) (at 30° C.) | 55 | 4.7 | 3.0 | 4.5 | 4.2 | 4.5 |
| Young's modulus of air permeation preventive layer (MPa) (23° C.) | 15 | 145 | 300 | 275 | 290 | 280 |
| Melting point of air permeation preventive layer (° C.) | — | 152 | 160 | 155 | 157 | 160 |
| Destruction of air permeation preventive layer after vulcanization | No | Yes (bubbles) | Yes (bubbles) | No | No | No |
| Peeling strength of air permeation preventive layer/carcass layer (N/cm) (23° C.) | 40 | 33 | 35 | 39 | 38 | 38 |
| Long term water resistance and moisture absorption resistance test | Passed | Failed | Passed | Passed | Passed | Passed |
| Long term durability test | Passed | Passed | Failed | Passed | Passed | Passed |
| Long term heat resistance test | Passed | Failed | Failed | Passed | Passed | Passed |
| Tire air leakage performance (%/month) | 3.0 | 2.7 | 1.9 | 2.6 | 2.5 | 2.6 |
| Thickness of air permeation preventive layer (mm) | 0.50 | 0.05 | 0.05 | 0.05 | 0.05 | 0.05 |
| Mass of air permeation preventive layer (g) | 480 | 47 | 48 | 47 | 47 | 47 |

| | Standard ex. | Ex. III-4 | Ex. III-5 | Ex. III-6 | Ex. III-7 | Ex. III-8 |
|---|---|---|---|---|---|---|
| Material of air permeation preventive layer | Butyl rubber | Alkoxyalkylated aliphatic polyamide resin | | | | |
| Step of coating air permeation preventive layer | — | Before tire vulcanization | | | | |
| Type of polyamide/Amount of polyamide (parts) | — | Luckamide 100 | Luckamide 100 | Luckamide 100 | Luckamide 100 | Polymer B 100 |
| Cross-linking or curing of polyamide | — | Yes | Yes | Yes | Yes | Yes |
| Cross-linking agent | — | — | — | — | — | — |
| Acid catalyst/Amount of catalyst (parts) | — | — | — | Form. 6 | Form. 7 | Form. 8 |
| Other than acid Curable resin | — | Form. 4 | Form. 5 | — | — | — |
| Air permeation coefficient of air permeation preventive layer ×$10^{-12}$ (cc · cm/cm² · sec · cmHg) (at 30° C.) | 55 | 3.8 | 3.5 | 3.3 | 3.5 | 4.8 |
| Young's modulus of air permeation preventive layer (MPa) (23° C.) | 15 | 340 | 364 | 487 | 430 | 383 |
| Melting point of air permeation preventive layer (° C.) | — | 178 | 175 | 170 | 170 | 160 |
| Destruction of air permeation preventive layer after vulcanization | No | No | No | No | No | No |
| Peeling strength of air permeation preventive layer/carcass layer (N/cm) (23° C.) | 40 | 37 | 37 | 35 | 36 | 37 |
| Long term water resistance and moisture absorption resistance test | Passed | Passed | Passed | Passed | Passed | Passed |
| Long term durability test | Passed | Passed | Passed | Passed | Passed | Passed |
| Long term heat resistance test | Passed | Passed | Passed | Passed | Passed | Passed |
| Tire air leakage performance (%/month) | 3.0 | 2.3 | 2.2 | 2.1 | 2.2 | 2.8 |
| Thickness of air permeation preventive layer (mm) | 0.50 | 0.05 | 0.05 | 0.05 | 0.05 | 0.05 |
| Mass of air permeation preventive layer (g) | 480 | 49 | 50 | 49 | 49 | 48 |

(Note)
Tire size: 165SR13 steel radial tire.

TABLE III-2

| | Standard ex. | Comp. Ex. III-3 | Comp. Ex. III-4 | Comp. Ex. III-5 | Ex. III-9 | Ex. III-10 |
|---|---|---|---|---|---|---|
| Material of air permeation preventive layer | Butyl rubber | Alkoxyalkylated aliphatic polyamide resin | | | | |
| Step of coating air permeation preventive layer | — | After tire vulcanization | | | | |
| Type of polyamide/Amount of polyamide (parts) | — | Luckamide 100 | Luckamide 100 | Polymer C*¹ 100 | Polymer A 100 | Polymer A 100 |
| Cross-linking or curing of polyamide | — | No | Yes | Yes | Yes | Yes |

TABLE III-2-continued

| Cross-linking agent | | | | | | |
|---|---|---|---|---|---|---|
| Acid catalyst/Amount of catalyst (parts) | — | — | Tartaric acid 5 | — | — | — |
| Other than acid | — | — | — | Form. 1 | Form. 1 | Form. 2 |
| Curable resin | — | — | — | — | — | — |
| Cross-linking/curing heat treatment conditions | — | — | 150° C. × 5 min | 160° C. × 10 min | 160° C. × 10 min | 160° C. × 10 min |
| Air permeation coefficient of air permeation preventive layer ×10$^{-12}$ (cc · cm/cm$^2$ · sec · cmHg) (at 30° C.) | 55 | 4.7 | 5.3 | 4.5 | 4.5 | 4.2 |
| Young's modulus of air permeation preventive layer (MPa) (23° C.) | 15 | 145 | 252 | 223 | 222 | 240 |
| Peeling strength of air permeation preventive layer/carcass layer (N/cm) (23° C.) | 40 | 25 | 28 | 35 | 35 | 32 |
| Long term water resistance and moisture absorption resistance test | Passed | Failed | Passed | Passed | Passed | Passed |
| Long term durability test | Passed | Passed | Failed | Passed | Passed | Passed |
| Long term heat resistance test | Passed | Failed | Failed | Failed | Passed | Passed |
| Tire air leakage performance (%/month) | 3.0 | 2.7 | 2.9 | 2.6 | 2.6 | 2.5 |
| Thickness of air permeation preventive layer (mm) | 0.50 | 0.05 | 0.05 | 0.05 | 0.05 | 0.05 |
| Mass of air permeation preventive layer (g) | 480 | 47 | 47 | 48 | 48 | 47 |
| Melting point of air permeation preventive layer (° C.) | — | 152 | 160 | 75 | 155 | 157 |

| | Standard ex. | Ex. III-11 | Ex. III-12 | Ex. III-13 | Ex. III-14 | Ex. III-15 | Ex. III-16 |
|---|---|---|---|---|---|---|---|
| Material of air permeation preventive layer | Butyl rubber | Alkoxyalkylated aliphatic polyamide resin | | | | | |
| Step of coating air permeation preventive layer | — | After tire vulcanization | | | | | |
| Type of polyamide/Amount of polyamide (parts) | — | Polymer A 100 | Luckamide 100 | Luckamide 100 | Luckamide 100 | Luckamide 100 | Polymer B 100 |
| Cross-linking or curing of polyamide | — | Yes | Yes | Yes | Yes | Yes | Yes |
| Cross-linking agent | | | | | | | |
| Acid catalyst/Amount of catalyst (parts) | — | — | — | — | — | — | — |
| Other than acid | — | Form. 3 | — | — | Form. 6 | Form. 7 | Form. 8 |
| Curable resin | — | — | Form. 4 | Form. 5 | — | — | — |
| Cross-linking/curing heat treatment conditions | — | 160° C. × 10 min | 130° C. × 10 min | 130° C. × 10 min | 160° C. × 10 min | 160° C. × 10 min | 160° C. × 10 min |
| Air permeation coefficient of air permeation preventive layer ×10$^{-12}$ (cc · cm/cm$^2$ · sec · cmHg) (at 30° C.) | 55 | 4.5 | 3.8 | 3.5 | 3.3 | 3.5 | 4.8 |
| Young's modulus of air permeation preventive layer (MPa) (23° C.) | 15 | 236 | 340 | 364 | 487 | 430 | 316 |
| Peeling strength of air permeation preventive layer/carcass layer (N/cm) (23° C.) | 40 | 35 | 22 | 23 | 22 | 24 | 36 |
| Long term water resistance and moisture absorption resistance test | Passed | Passed | Passed | Passed | Passed | Passed | Passed |
| Long term durability test | Passed | Passed | Passed | Passed | Passed | Passed | Passed |
| Long term heat resistance test | Passed | Passed | Passed | Passed | Passed | Passed | Passed |
| Tire air leakage performance (%/month) | 3.0 | 2.6 | 2.3 | 2.2 | 2.1 | 2.2 | 2.8 |
| Thickness of air permeation preventive layer (mm) | 0.50 | 0.05 | 0.05 | 0.05 | 0.05 | 0.05 | 0.05 |
| Mass of air permeation preventive layer (g) | 480 | 47 | 49 | 50 | 49 | 49 | 48 |
| Melting point of air permeation preventive layer (° C.) | — | 160 | 178 | 175 | 170 | 170 | 160 |

(Note) Tire size: 165SR13 steel radial tire.
*[1]: Polymer C: Synthesized by a method similar to the Polymer B but making the reacted nylon a nylon 6/66/610/12.

As explained above, according to the third aspect of the present invention, it is possible to obtain a pneumatic tire having an air permeation preventive layer in which the weight of the tire can be reduced in while maintaining an excellent air pressure retention in the tire, which is superior in bonding with a rubber layer, and which is superior in water resistance (resistance to humidity) and heat resistance.

Examples IV-1 to IV-5 and Comparative Examples IV-1 to IV-3

Examples IV-1 to IV-3 and Comparative Examples IV-1 to IV-3 are examples of coating a vinylidene chloride resin composition after vulcanization of the tire. The inner surface of a tire vulcanized by a tire vulcanizer at 185° C. for 15 minutes at a pressure of 2.3 MPa by an ordinary method was halogenated (brush-coated with a 3.3% solution of trichloroiso-cyanuric acid in ethyl acetate and then dried for 2 hours) or coated with an adhesive (brush coated with LORD Chemlock 205 and dried for 2 hours), then was spray-coated by a solution comprised of a mixed solvent of 35% by weight of toluene and 65% by weight of methyl ethyl ketone in which has been dissolved a vinylidene chloride resin in a proportion of 20% by weight, then was dried by blowing hot air of 80° C. for 2 minutes to form the air permeation preventive layer.

Further, Example IV-4 is an example of the case of coating a vinylidene chloride resin composition before vulcanization of the tire. The inner surface of a green tire molded by an ordinary method and comprised of unvulcanized rubber was halogenated in the same way as above, then was spray-coated with a solution prepared in the same way as above and dried in the same way as above. The green tire was then vulcanized by a tire vulcanizer under similar vulcanization conditions.

Further, the standard Example of a tire used a butyl rubber composition of the following formulation as an inner liner layer:

| | |
|---|---|
| Br-IIR*1 | 100 |
| Carbon black (GPF)*2 | 60 |
| Stearic acid | 1 |
| Petroleum based hydrocarbon resin*3 | 10 |
| Paraffinic process oil | 10 |
| Zinc oxide | 3 |
| DM | 1 |
| Sulfur | 0.6 |

*1: Br-IIR: Exxon Bromobutyl 2244, Exxon Chemical
*2: GPF: Seast V, Tokai Carbon
*3: Escorez 1102, Esso Chemical
*4: Paraffinic process oil: Machine Oil 22, Showa Shell The methods of evaluation used in the following examples were as follows:

Solubility

The vinylidene chloride resin was added to 10 cc of a mixed solvent composed of methyl ethyl ketone and toluene in a 63:35 ratio by weight to give 20% by weight. This was then stirred. Samples dissolving within 30 to 60 minutes were indicated by a "o" mark and those not dissolving by an "x" mark.

Measurement of Air Permeation Coefficient of Air Permeation Preventive Layer

According to JIS K7126 "Test Method of Gas Permeability of Plastic Films and Sheets (Method A)".

Test piece: Film samples (I) (sheets of thickness of approximately 100 µm prepared by dissolving 20% by weight of vinylidene chloride resin in mixed solvent of methyl ethyl ketone/toluene=65/35 (ratio by weight), spreading the result on glass using a doctor blade, drying at ordinary temperature, and further drying under vacuum).

Test gas: Air ($N_2:O_2=8:2$)

Test temperature: 30° C.

Method for Measurement of Youna's Modulus of Film

See above.

Method for Measurement of Softening Point of Air Permeation Preventive Layer

Using the same method of preparation as with the measurement of the air permeation coefficient, sheets of a thickness of about 1 mm were prepared. These were superposed to a thickness of 5 mm and then a TMA was used for measurement at a load of 5 g, a rate of temperature rise of 10° C./min, and the compression method. The point of inflexion was used as the softening point.

Method for Testing Long Term Water Resistance and Moisture Absorbing Resistance

See above.

Method for Testing Long Term Durability

See above.

Method for Testing Long Term Heat Resistance

See above.

Method for Testing Tire Air Leakage Performance

See above.

Formulation of Rubber for Tire Carcass

| Ingredient | Parts by weight |
|---|---|
| Natural rubber | 80.0 |
| SBR 1502 | 20.0 |
| FEF carbon black | 50.0 |
| Stearic acid | 2.0 |
| Zinc oxide | 3.0 |
| Sulfur | 3.0 |
| Vulcanization accelerator (NS) | 1.0 |
| Aromatic oil | 2.0 |

Method of Halogenation Treatment

The entire inner surface of a green tire before vulcanization or a tire after vulcanization was coated with a solution of 3.3% of trichloroisocyanuric acid in ethyl acetate then was allowed to stand at ordinary temperature for at least 3 hours for halogenation.

The results of Examples IV-1 to IV-3 of the case of halogenation of the inner surfaces of vulcanized tires, Example IV-4 of the case of halogenation of the inner surface of an unvulcanized green tire, and Example IV-5 of the case of treatment of the inner surface of a tire after vulcanization by an adhesive (LORD Chemlock 205) are shown in Table IV-1.

TABLE IV-1

| | | Ex. IV-1 | Ex. IV-2 | Ex. IV-3 | Ex. IV-4 | Ex. IV-5 | Comp. Ex. IV-1 | Comp. Ex. IV-2 | Comp. Ex. IV-3 | Comparative tire |
|---|---|---|---|---|---|---|---|---|---|---|
| Material of air permeation preventive layer | Main component | Vinylidene chloride polymer | | | | | | | | Butyl rubber (tie rubber interposed) |
| | Copolymer comp. | Acrylonitrile | | | | | | Vinyl chloride | Acryl ester | |
| | copolymerization mol % | 15 | 30 | 50 | 30 | 30 | 3 | 15 | 15 | |
| Solubility | | ○ | ○ | ○ | ○ | ○ | X | ○ | ○ | — |
| Air permeation coefficient ×$10^{-12}$ cc · cm/cm$^2$ · sec · cmHg (at 30° C.) | | 0.11 | 0.35 | 1.01 | 0.35 | 0.35 | 0.08 | 1.30 | 0.90 | 55 |
| Young's modulus (MPa) | | 1.8 | 2.0 | 5.0 | 2.0 | 2.0 | 5.0 | 3.5 | 4.5 | 15 |
| Softening point | | 110 | 130 | 180 | 130 | 130 | 200 | 68 | 70 | — |
| The air leakage performance (%/month) | | 0.33 | 0.63 | 1.3 | 0.63 | 0.63 | 0.22 | 2.0 | 1.4 | 3.0 |
| Long term durability test | | ○ | ○ | ○ | ○ | ○ | ○ | X | X | ○ |

TABLE IV-1-continued

|  | Ex. IV-1 | Ex. IV-2 | Ex. IV-3 | Ex. IV-4 | Ex. IV-5 | Comp. Ex. IV-1 | Comp. Ex. IV-2 | Comp. Ex. IV-3 | Comparative tire |
|---|---|---|---|---|---|---|---|---|---|
| Long term heat resistance test | ○ | ○ | ○ | ○ | ○ | ○ | X | X | ○ |
| Long term water resistance test | ○ | ○ | ○ | ○ | ○ | ○ | X | X | ○ |
| Weight and thickness of air permeation preventive layer | 19 g/20 μm | 18 g/20 μm | 17 g/20 μm | 18 g/20 μm | 18 g/20 μm | 20 g/20 μm | 20 g/20 μm | 19 g/20 μm | 480 g/500 μm |
| Method of treatment of inner surface of tire | Halogenation of vulcanized inner surface | Halogenation of vulcanized inner surface | Halogenation of vulcanized inner surface | Halogenation of unvulcanized inner surface | Adhesive treatment of vulcanized inner surface | Halogenation of vulcanized inner surface | Halogenation of vulcanized inner surface | Halogenation of vulcanized inner surface | — |

(Note) The test tire was a size 165SR13 steel radial tire.

As explained above, according to the fourth aspect of the present invention, it is possible to obtain a pneumatic tire having an air permeation preventive layer which enables the weight of the tire to be reduced while maintaining an excellent air pressure retention in the tire, which is superior in bonding with a rubber layer, and which is superior in water resistance (humidity resistance) and heat resistance).

What is claimed is:

1. A process for producing a pneumatic tire having an air permeation preventive layer obtained from the curing of a liquid composition containing (i) a multi component copolymer polyamide resin, (ii) a curable resin, and (III) a curing agent for curing the curable resin, said process comprising:

spraying or coating a liquid composition containing (i) a multi component copolymer polyamide resin, (ii) a curable resin, and (iii) a curing agent for curing the curable resin on a surface of a carcass layer of a green tire comprising unvulcanized rubber or the surface of a rubber layer provided on the surface of the carcass layer which has been halogenated, and then vulcanizing the green tire, whereby an air permeation preventive layer is formed.

2. A process for producing a pneumatic tire having an air permeation preventive layer obtained from the curing of a liquid composition containing (i) a multi component copolymer polyamide resin, (ii) a curable resin, and (iii) a curing agent for curing the curable resin, said process comprising:

spraying or coating a liquid composition containing (i) a multi component copolymer polyamide resin, (ii) a curable resin, and (iii) a curing agent for curing the curable resin on a surface of a carcass layer of a green tire comprising unvulcanized rubber or the surface of a rubber layer provided on the surface of the carcass layer to which an adhesive has been coated, and then vulcanizing the green tire, whereby an air permeation preventive layer is formed.

3. A process for producing a pneumatic tire having an air permeation preventive layer obtained from the curing of a liquid composition containing (i) a multi component copolymer polyamide resin, (ii) a curable resin, and (iii) a curing agent for curing the curable spraying or coating a liquid composition containing (i) a multi component copolymer polyamide resin, (ii) a curable resin, and (iii) a curing agent for curing the curable resin on a surface of a carcass layer of a vulcanized tire or the surface of a rubber layer provided on the surface of the carcass layer which has been halogenated, followed by curing, whereby an air permeation preventive layer is formed.

4. A process for producing a pneumatic tire having an air permeation preventive layer obtained from the curing of a liquid composition containing (i) a multi component copolymer polyamide resin, (ii) a curable resin, and (iii) a curing agent for curing the curable resin, said process comprising:

spraying or coating a liquid composition containing (i) a multi component copolymer polyamide resin, (ii) a curable resin, and (iii) a curing agent for curing the curable resin on a surface of a carcass layer of a vulcanized tire or the surface of a rubber layer provided on the surface of the carcass layer to which an adhesive has been coated, followed by curing whereby an air permeation preventive layer is formed.

5. A process for producing a pneumatic tire according to claim 1, wherein the air permeation preventive layer has an air permeation coefficient of $25 \times 10^{-12}$ cc·cm/cm$^2$·sec·cmHg (at 30° C.) or less, and a Young's modulus of 1 to 500 Mpa.

6. A process for producing a pneumatic tire according to claim 2, wherein the air permeation preventive layer has an air permeation coefficient of $25 \times 10^{-12}$ cc·cm/cm$^2$·sec·cmHg (at 30° C.) or less, and a Youngls modulus of 1 to 500 Mpa.

7. A process for producing a pneumatic tire according to claim 3, wherein the air permeation preventive layer has an air permeation coefficient of $25 \times 10^{-12}$ cc·cm/cm$^2$·sec·cmHg (at 30° C.) or less, and a Young's modulus of 1 to 500 Mpa.

8. A process for producing a pneumatic tire according to claim 4, wherein the air permeation preventive layer has an air permeation coefficient of $25 \times 10^{-12}$ cc·cm/cm$^2$·sec·cmHg (at 30° C.) or less, and a Young's modulus of 1 to 500 Mpa.

9. A pneumatic tire obtained according to the process of claim 1.

10. A pneumatic tire obtained according to the process of claim 2.

11. A pneumatic tire obtained according to the process of claim 3.

12. A pneumatic tire obtained according to the process of claim 4.

* * * * *

UNITED STATES PATENT AND TRADEMARK OFFICE
CERTIFICATE OF CORRECTION

PATENT NO.    : 6,244,317 B1                                            Page 1 of 1
DATED         : June 12, 2001
INVENTOR(S)   : Kazuto Yamakawa et al.

It is certified that error appears in the above-identified patent and that said Letters Patent is hereby corrected as shown below:

Column 39,
Line 60, after "curable", insert -- resin, said process comprising: --

Column 40,
Line 45, "Youngls" should read -- Young's --.

Signed and Sealed this

Thirtieth Day of July, 2002

*Attest:*

JAMES E. ROGAN
*Attesting Officer*   *Director of the United States Patent and Trademark Office*